United States Patent
Ditter et al.

(12) 
(10) Patent No.: US 6,371,274 B1
(45) Date of Patent: Apr. 16, 2002

(54) MAGNETIC PALLET CLAMPING SYSTEM

(75) Inventors: Norman J. Ditter; Christopher C. Rindels, both of Rockford, IL (US)

(73) Assignee: The Ingersoll Milling Machine Company, Rockford, IL (US)

( * ) Notice: Subject to any disclaimer, the term of this patent is extended or adjusted under 35 U.S.C. 154(b) by 0 days.

(21) Appl. No.: 09/382,722

(22) Filed: Aug. 25, 1999

Related U.S. Application Data
(60) Provisional application No. 60/098,047, filed on Aug. 27, 1998.

(51) Int. Cl.$^7$ .............................................. B65G 47/00
(52) U.S. Cl. ................................... 198/345.3
(58) Field of Search ........................ 198/345.3, 390.1; 269/309; 29/33 P, 281.4, 799

(56) References Cited

U.S. PATENT DOCUMENTS

| | | | |
|---|---|---|---|
| 3,178,620 A | | 4/1965 | Berker, Sr. |
| 3,571,911 A | | 3/1971 | Littwin |
| 3,629,756 A | | 12/1971 | Holtz |
| 4,014,428 A | * | 3/1977 | Ossbahr .................. 198/345.3 |
| 4,066,177 A | | 1/1978 | Gidley et al. |
| 4,468,648 A | | 8/1984 | Uchikune |
| 4,485,911 A | * | 12/1984 | Cameron ................. 198/345.3 |
| 4,575,702 A | | 3/1986 | Nitta et al. |
| 4,603,456 A | * | 8/1986 | Hiroyasu et al. ........ 198/345.3 |
| 4,679,021 A | | 7/1987 | Braillon |
| 4,684,112 A | | 8/1987 | Chernikov et al. |
| 5,509,524 A | * | 4/1996 | Ohmori et al. .......... 198/690.1 |

\* cited by examiner

Primary Examiner—Joseph E. Valenza
(74) Attorney, Agent, or Firm—Fitch, Even, Tabin & Flannery

(57) ABSTRACT

A machining system and method of machining are provided for machining large, heavy workpieces, such as large aircraft components, that are oriented vertically affixed on a vertical, on-edge pallet. The machining system includes an upstanding workpiece support to which the transportable pallet is clamped. The pallet is large enough to support the large workpiece but is still relatively thin and light so that it can be easily transported to the machining station where the more massive workpiece support is located. The pallet lacks the necessary stiffness for accurate machining of the part thereon. The much thicker upstanding support is utilized to provide the pallet and affixed part the necessary stiffness when the pallet is clamped thereto, by a magnetic clamping arrangement. The magnetic clamping provides quick assembly and disassembly of the pallet with the support stand thereby decreasing cycle time and increasing production rates. Also, the magnetic clamping makes the pallet strong and rigid like the support stand during the machining operation. The magnets are arranged on the support stand so as to spread out and evenly balance the magnetic attraction force across the backside of the pallet. Registering members on the stand and pallet locate magnetizable areas on the pallet so that they are aligned with corresponding magnets on the stand. A controller fires the magnets in a predetermined sequence to draw the pallet against the magnets for clamping it thereto. The magnets are preferably of the electropermanent type so that they take a charge and do not need continuous power to keep generating the magnetic attraction force so as to keep the pallet clamped thereto during power interruptions.

16 Claims, 16 Drawing Sheets

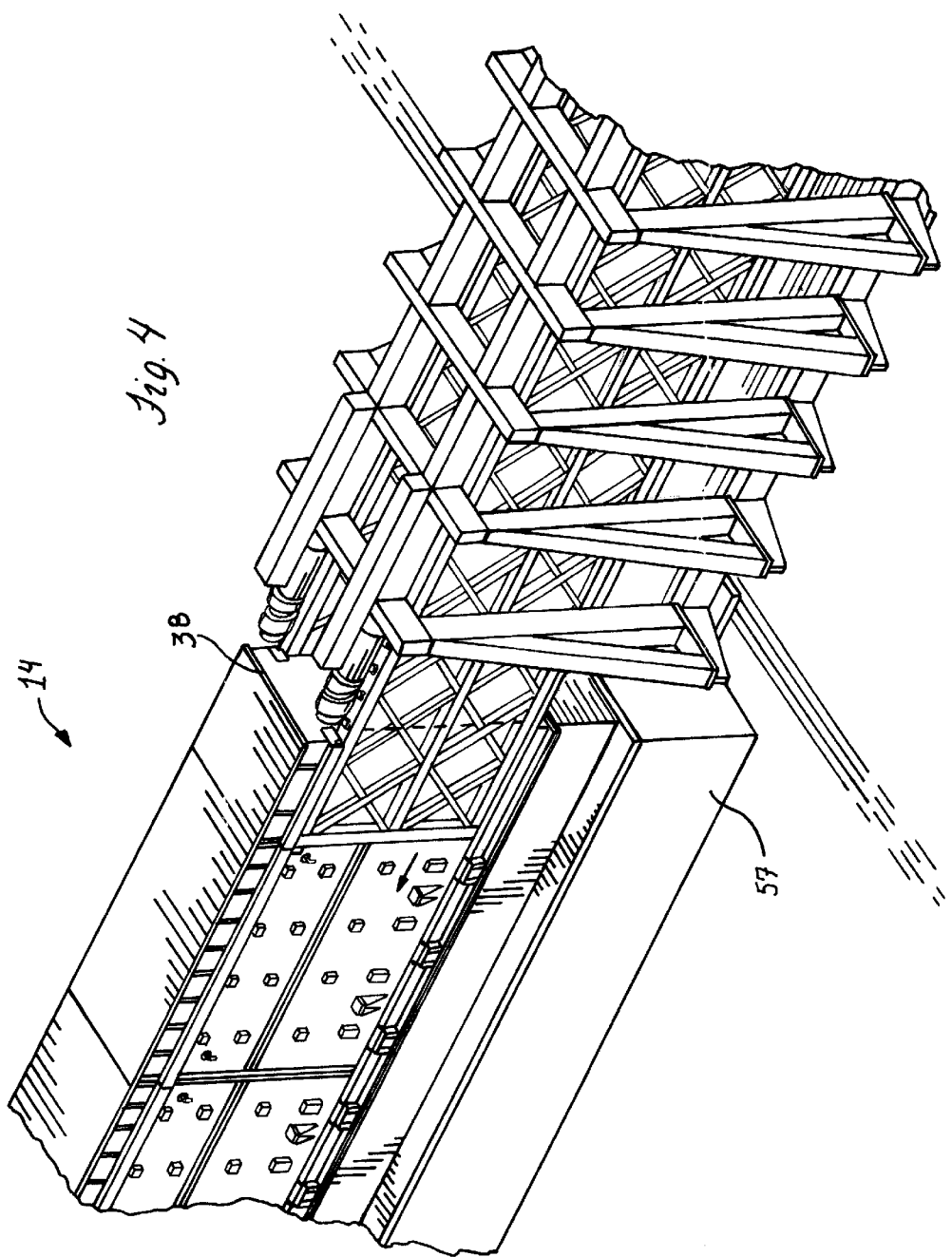

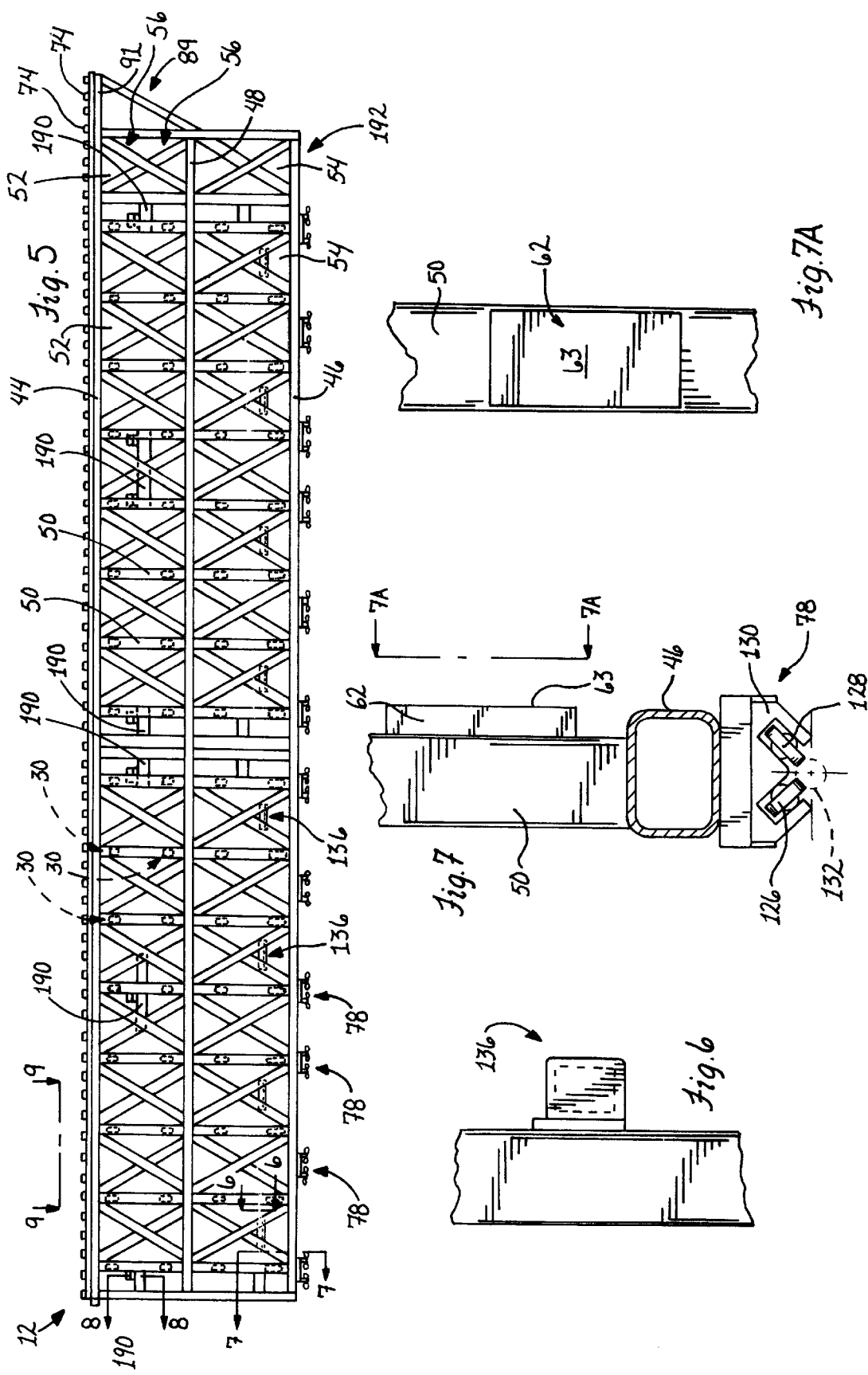

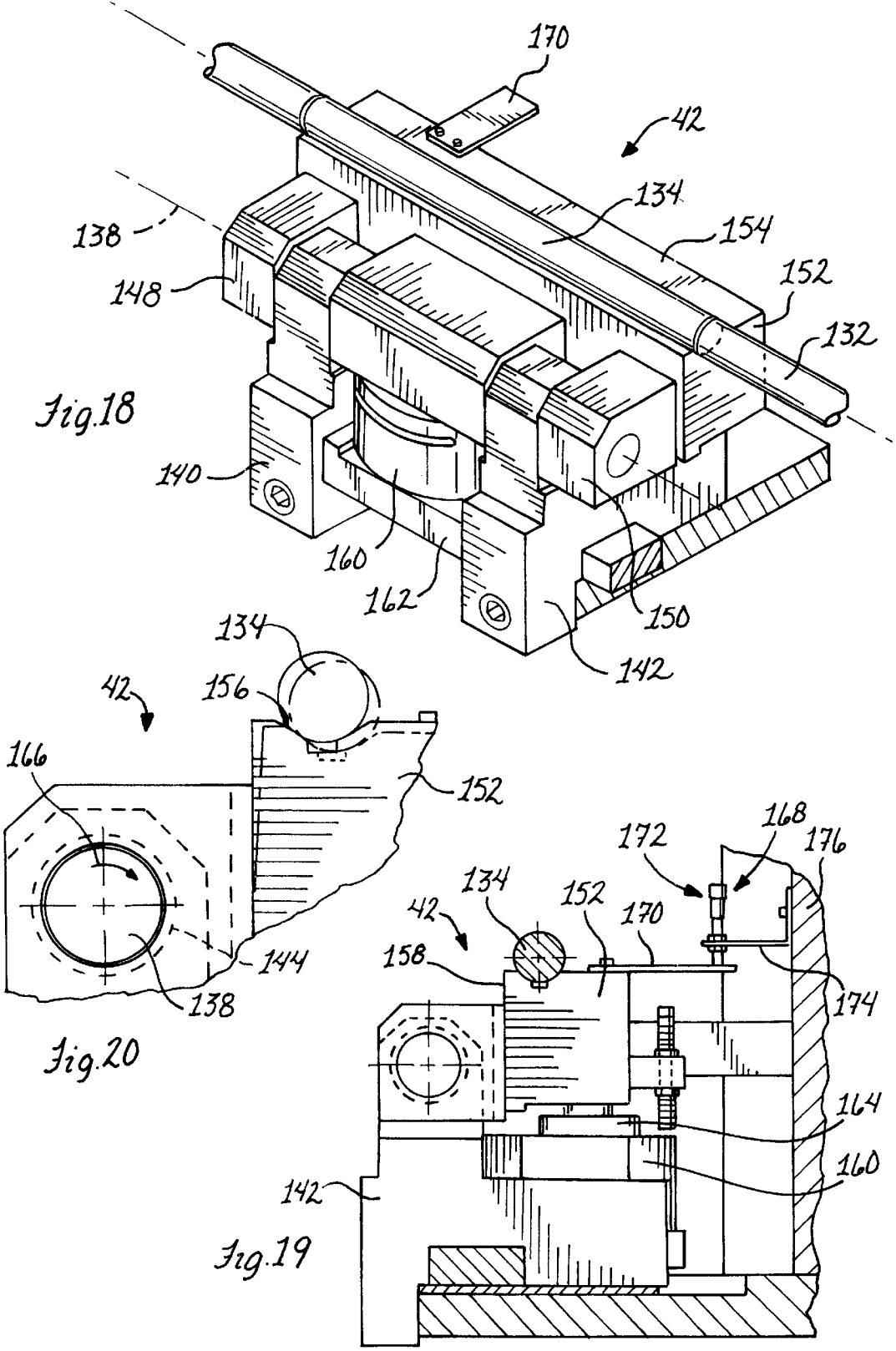

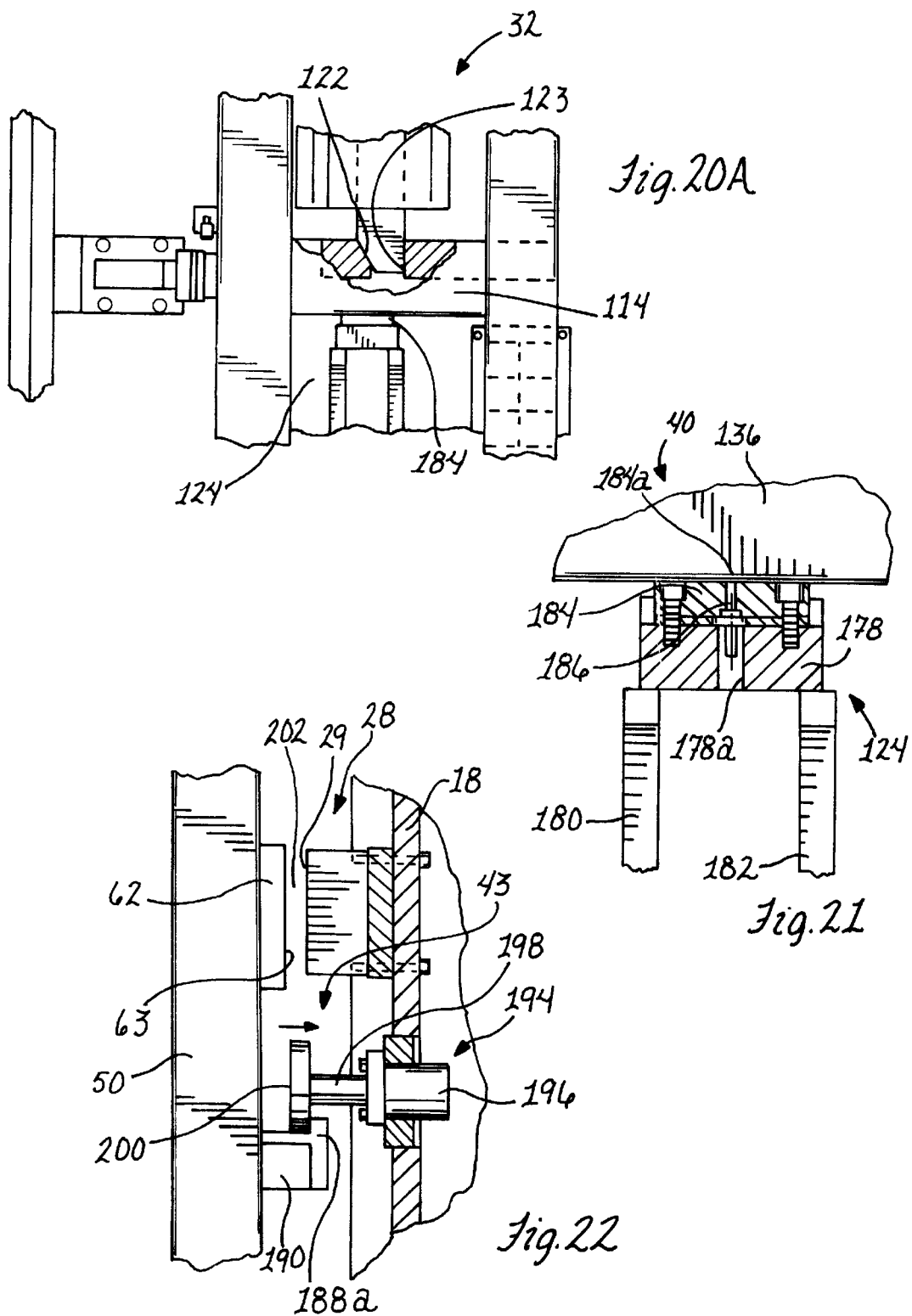

MAGNETIC PALLET CLAMPING SYSTEM

CROSS-REFERENCE TO RELATED APPLICATION

This application claims the benefit of U.S. Provisional Application No. 60/098,047, filed Aug. 27, 1998.

FIELD OF THE INVENTION

The invention relates to workpiece machining systems and, more particularly, to a system and method for clamping of a pallet carrying a workpiece to a support stand for aligning the workpiece and giving it the necessary stiffness for accurate machining thereof.

BACKGROUND OF THE INVENTION

For machining of workpieces, special requirements or unique workpieces often govern the selection of a specific type of machine and fixturing. For instance, the size and configuration of the workpiece may affect the stiffness or rigidity with which a part can be held while being machined. In machining of large parts, a major consideration is the rigidity of the fixturing of the large part. An effective fixture for machining some large parts such as aircraft parts is a problem because of their great size in relation to wall thickness. Nevertheless, rigidity of the machine and setup is essential for optimum results. Lack of sufficient rigidity in the tooling and workpiece setup can result in tool deflection and chatter causing excessive tool wear and breakage, damage to workpieces, dimensional inaccuracy, and unacceptable surface finish.

Large and/or extremely heavy parts are usually cut by machines designed specifically for these parts. The present invention will be described in connection with one use thereof which is the profile machining of large aircraft parts; but the invention is not limited to this particular use of the invention. Large aircraft parts can be machined by profilers which are high and very long machines having horizontal spindles for advancing the cutting tool transversely relative to high and long vertical surfaces on the large parts for machining thereof. Because these large, heavy parts are not lying flat and are upstanding when being machined, there generally is greater instability introduced into the fixturing, making it very difficult to mount the part so that it is held with sufficient rigidity and has the necessary stiffness to provide for accurate machining results.

The profilers are machine tools that can generally include support structure and carriages, e.g., columns and rams, driven as by linear motors for carrying spindles along three axes of movement for high speed and high force machining along the entire extent of the large aircraft component and which can also include a nutating head for machining at various angles into the workpiece transversely to the vertical. These types of machines represent a major capital investment so that their use is generally restricted to removing large amounts of metal from massive workpieces like aircraft components. In machining large aircraft components, skin milling, which involves deep cuts, i.e., on the order half an inch or more, is commonplace. In rugged machining operations such as these where there are deep, heavy cuts, the workpiece will commonly be subjected to such great force, e.g. on the order of approximately 500 lbs. of cutting force, that it will bend and shift if not firmly secured which, as previously discussed, can be especially difficult with large, heavy workpieces that are arranged vertically. In this regard, stiffness of the part being machined is critical so as to avoid damage to the workpiece by miscuts, and damage to the tools and machine.

Accordingly, with the above-described profiler machines, the aircraft parts are mounted and clamped to a fixture plate that has, in turn, been clamped to a large thick and stiff pallet which gives the part the stiffness or rigidity necessary for accurate machining. In other words, it is the large thick pallet that provides the heavy fixture to add sufficient rigidity to the setup for the large part. Once the part is properly mounted to the pallet, it is then transported to the profiler machine for machining. This rigid setup minimizes or eliminates the previously discussed adverse conditions that can occur when machining large, relatively thin cross-section aircraft components in terms of obtaining proper fixturing, thereby increasing production and lowering production cost, and also allowing for increased feed rates and spindle speeds to be utilized which further increases production rates.

A shortcoming of the use of the pallet to provide the part the required stiffness is that the pallet itself has to be sufficiently massive for this purpose. Before setup, the pallets have to be transported from storage to the setup location. Once the part is mounted to the pallet, the massive pallet and attached part have to be moved to the profiler machine for machining. Where the pallet'storage is removed from where the part setup is to occur, and also where the setup of the part to the pallet is at some distance from the machine tool, the sheer size of the pallet and attached part can create problems in terms of time, equipment and manpower in transporting this assembly to the machine. Thus, there is a need for a machining system for workpieces, such as large, heavy thin-walled aircraft components, which provides sufficient stiffness to the part while being machined without the drawbacks afforded by the use of large, thick and heavy pallet fixtures.

SUMMARY OF THE INVENTION

In accordance with the present invention, a new and improved machining system is provided for machining large, heavy workpieces that are oriented vertically, such as large aircraft components. The machining system includes a workpiece support and a transportable thin pallet for being selectively magnetically clamped to the support. The pallet is large enough to support the large workpiece but is still relatively thin and light so that it can be easily transported to the machining station where the workpiece support is located. Due to the very large pallet surface area for mounting of the large workpiece, and because it is not very thick, e.g., approximately 8 inches, and has an open frame construction, the pallet on its own cannot impart the stiffness to the part necessary for accurate machining. The much thicker upstanding support is utilized to provide the pallet and affixed part the necessary stiffness when the pallet is clamped thereto, by a magnetic clamping arrangement that will be described hereinafter. In this manner, it is the larger workpiece support with its greater mass and stiffness vis-a-vis the transportable pallet that provides the workpiece mounted to the pallet the necessary stiffness so that it can be accurately machined. And because the pallet is relatively thin and flexible, it can more easily be maneuvered and transported than if it were the pallet that had to provide the stiffness for machining which would require it to be much more massive akin to the pallets previously utilized and thus making it much more difficult to transport. Thus, the present invention keeps workpieces held in a fixed and stationary position when they are being machined but not when they are being transported so that the weight of a large, heavy and massive pallet need not be transported.

In accordance with an important aspect of the invention, the use of magnetic attraction forces to clamp the pallet to the support results in quick assembly and disassembly of the pallets to the support. This reduces machining cycle time and increases production rates. Additionally, the magnetic forces provide a strong uniform clamping force across the entire area of the pallet that makes it strong and rigid like the stand support during the machining operation.

In one form of the invention, a machining system is provided for machining heavy workpieces by a cutting machine located at a predetermined machining position. A workpiece support upstanding at the machining position receives and holds a pallet in a vertical position during a machining operation on a vertical surface of the workpiece. A transportable pallet is provided having a vertical side and a workpiece affixed to the vertical side at a precise position thereon for being machined by the cutting machine while the pallet is on edge and being vertically positioned. Electromagnets and magnetizable areas are provided on the work support and the transportable pallet to magnetically clamp the transportable pallet to the workpiece support. A transporter transports the transportable pallet with the workpiece to and from the workpiece support. Registering members on the workpiece support and on the transportable pallet are brought into engagement to register the pallet on the workpiece support to locate the workpiece on the pallet at a predetermined position on a vertical side of the workpiece support. The upstanding workpiece support has a mass and stiffness substantially greater than the mass and stiffness of the transportable pallet. The transportable pallet has a stiffness substantially less than needed for the machining operation by the cutting machine and the magnet clamping of the electromagnets and magnetizable areas causes the pallet and upstanding workpiece support to provide a combined stiffness for the workpiece projecting from the vertical, on-edge pallet to permit accurate machining of the workpiece. The present machining system provides good fixturing for large workpieces that are machined in a vertical orientation and are subjected to large cutting forces transversely directed relative to the vertical by the above-described magnetic clamping arrangement while also allowing the pallet to which the workpieces are to be mounted to be transported in a relatively easy and efficient manner.

The upstanding workpieces support can be several times thicker in the horizontal direction than the thickness of the transportable pallet. As stated, the large, thin transportable pallet is relatively flexible in comparison to the upstanding support with the thicker support imparting the strength and rigidity or stiffness necessary for accurate machining, and the flexible pallet being of less mass so that it is adapted for being transported to and from the machining location.

Preferably, a set-up stand is also provided with electromagnets and magnetizable areas on the set-up stand. The transportable pallet is magnetically clamped to the set-up stand to allow a workpiece to be positioned on and secured to the transportable pallet. A pallet storage station can be provided to hold and store a plurality of pallets with the transporter carrying pallets from the pallet storage station to the set-up stand and from the set-up stand to the machining position.

In one form, the transporter can include a lift mechanism to lift the transportable pallet and to lower the pallet onto stops on the workpiece support. A pull-in device pulls the pallet laterally to bring the electromagnets and magnetizable areas into close proximity. In this manner, when the magnets are energized, the impact between the electromagnets and magnetizable areas is minimized so as to reduce the amount of rubbing and wear therebetween.

In another form of the invention, a pallet holding apparatus is provided including a large fixed stationary stand for imparting stiffness to a relatively thin and flexible pallet to be held thereto. The stand has a vertical wall to which the pallet is held for either positioning and fixing a workpiece to the pallet or machining a fixed workpiece carried by the pallet. A plurality of magnets are spaced across the wall for exerting a magnetic force to bring the pallet toward the magnets for securing the pallet in a vertical orientation to the vertical wall of the stand without requiring mechanical or hydraulic type clamping mechanisms and services therefor for rapid attachment and detachment of the pallet to and from the stand. A plurality of corresponding magnet engaging areas are associated with the pallet with the areas being of a material that is attracted by the magnetic force so that the areas register against the magnets when the magnets are activated. The magnets and areas are arranged to spread out and balance the magnetic force to evenly draw the pallet against the stand wall across the entire extent of the pallet. A controller activates the magnets in a predetermined sequence for bringing the magnets and pallet areas into engagement with each other. The use of magnetic clamping of the pallet to the upstanding support obviates the need for mechanical and hydraulic clamping devices which generally require greater set-up time, and the associated lube and hydraulic oil service lines therefor. In this manner, the present system simplifies the equipment required for clamping the transportable pallet to the support, reducing maintenance costs and the probability of down time.

The pallet magnet engaging areas can be formed on pads attached to the pallet with the magnets and pads being arranged in horizontal rows across the stand and pallet. The controller activates the pallets in a bottom to top sequence with the lower rows of magnets activated for drawing in corresponding lower rows of pallet pads thereto before higher rows of magnets are activated.

In one form, the magnets are electropermanent magnets and the controller includes circuitry connected to the magnets with the controller activating or deactivating the magnets by supplying an electrical charge thereto via the circuitry without requiring continuing power to the magnets for magnetically attracting and holding the corresponding pallet magnet engaging areas thereto or releasing the areas therefrom. In this manner, power interruptions do not affect the magnetic holding force applied by the magnets to the pallet magnet engaging areas.

In one form, the pallet is approximately 10 to 20 meters in length. As previously stated, the stand can be several times thicker than the pallet, and preferably it is approximately seven to eight times thicker than the pallet.

In one form, each of the magnets exert between approximately 800 pounds to approximately 1200 pounds of magnetic force.

In a preferred form, the stand includes a shiftable way mechanism and has horizontal rests, and the pallet includes bearings and vertical locating members. The way mechanism has a support position with the pallet bearings being supported by the stand way mechanism, and a lowered position with the way mechanism shifted so that the pallet locating members engage the rests to locate the pallet vertically relative to the stand and with the weight of the pallet supported by the rests. The rests and locating members are disposed toward the bottoms of the stand and pallet, respectively, and the controller preferably activates the magnets in a bottom to top sequence for sliding the locating members along the stand rests to minimize and overcome the friction therebetween as the pallet is drawn toward the stand, and specifically against the magnets thereon. In a preferred form, the magnets disposed toward the bottom of the stand exert a larger magnetic force than the magnets thereabove for pulling the locating members with a greater force along the rests than the higher magnets.

In one form, the longitudinal and vertical alignment mechanisms cooperate between the stand and pallet for substantially aligning the magnets with the corresponding pallet areas prior to activation of the magnets by the controller.

Spacer members can be mounted between each magnet and the stand wall for being released to allow the magnets to be pulled off from the corresponding pallet areas for detaching the pallet from being magnetically held to the wall when power to the controller fails. The spacer members may include bolts for attaching the magnets thereto, with removal of the bolts releasing the spacer members from behind the magnets to allow the bolts to be reinserted for connecting to the magnets magnetically held on the corresponding pallet areas for pulling the magnets with the bolts off therefrom.

Another aspect of the present invention is a method of imparting strength and stiffness to a thin, flexible pallet on which a part to be machined is fixed. The method includes transporting the pallet from a first location to a second location, moving the pallet so that one side thereof is vertically oriented and faces a vertical wall of a large thick stationary stand at the second location, aligning magnets and corresponding magnet engaging areas on the stand and pallet with each other, activating the magnets to draw the pallet securely against the stand to provide stiffness and rigidity to a part during machining despite the flexibility of the thin pallet, and arranging the magnets so that the magnetic force exerted between the stand and pallet is spread out and balanced across the side of the pallet facing the stand for evenly drawing the pallet against the stand.

BRIEF DESCRIPTION OF THE DRAWINGS

FIG. 4 is a perspective view of the transporter at the machining stand for transferring pallets to the machining station;

FIG. 5 is an elevational view of the pallet showing horizontal rows of magnet engaging pads and vertical locating members in phantom attached on the rear side thereof;

FIG. 6 is an enlarged fragmentary elevational view taken along line 6—6 of FIG. 5 showing one of the vertical locating members;

FIG. 7 is an enlarged fragmentary elevational view partially in section taken along line 7—7 of FIG. 5 showing one of the magnet engaging pads and roller bearings at the bottom of the pallet;

FIG. 7A is an enlarged fragmentary elevational view taken along line 7A—7A of FIG. 7 of the magnet engaging pad;

FIG. 18 is an enlarged perspective view of a shiftable way mechanism of the way system;

FIG. 19 is an elevational view partially in section of the shiftable way mechanism showing a pivot shaft thereof for pivoting of a section of the rail and a limit switch for signaling the lowering and raising of the rail section;

FIG. 20 is an enlarged fragmentary view of the pivot shaft and rail section showing the rail section in its support position, and pivoted to its lowered position in phantom;

FIG. 20A is an elevational view of the tapered locking pin activated to fully engage the wedge block after lowering of the shiftable way mechanism;

FIG. 21 is an enlarged fragmentary elevational view partially in section showing one of the horizontal rests including a rubber pad rest with one of the vertical locating members resting thereon;

FIG. 22 is an enlarged fragmentary elevational view partially in section showing a pull-in device for pulling the upper portion of the pallet and its pads toward the stand vertical wall;

DETAILED DESCRIPTION OF THE PREFERRED EMBODIMENTS

Figure 1:
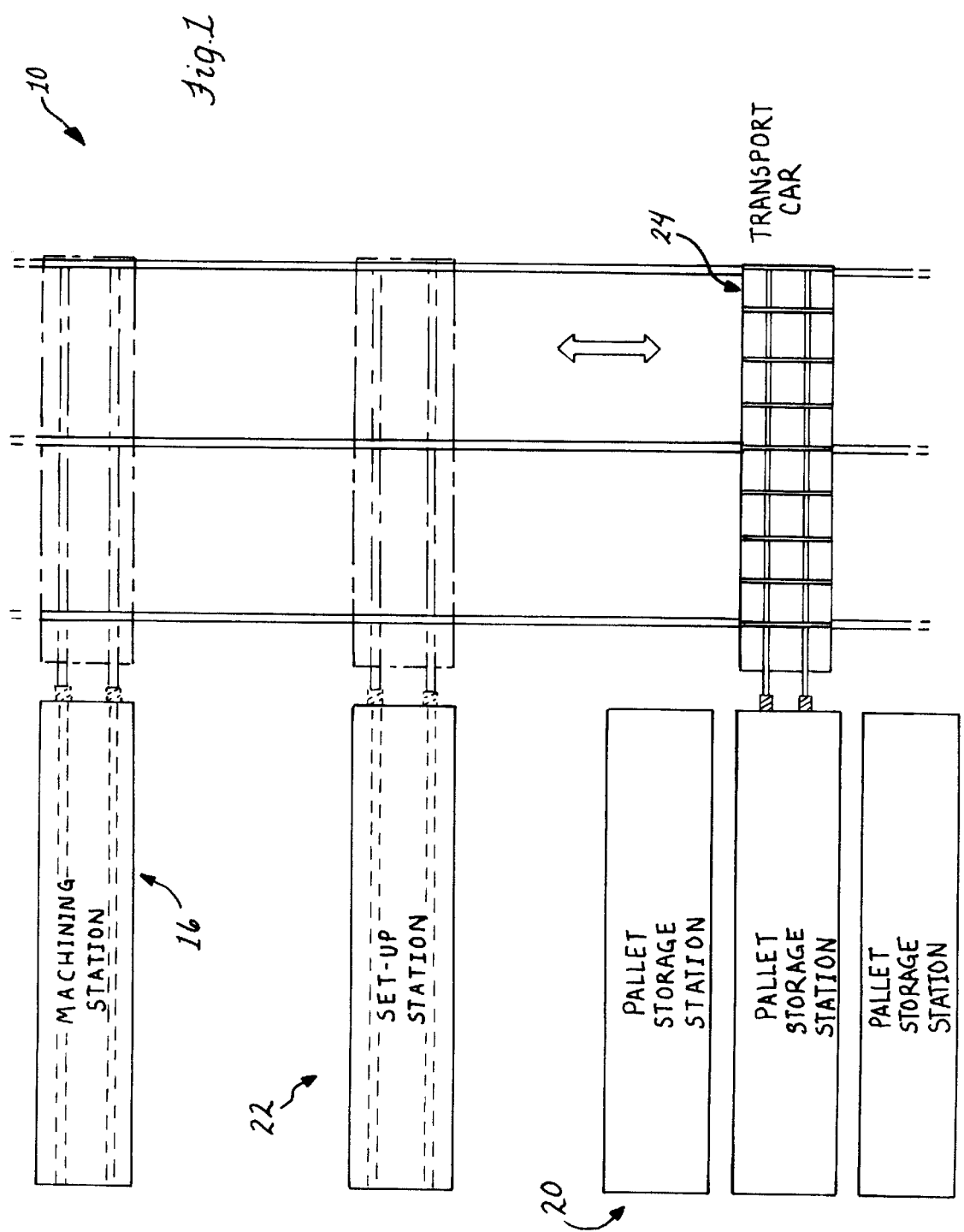
FIG. 1 is a schematic view of the machining system in accordance with the present invention showing a transporter for transferring pallets from a pallet storage station to a set-up station and then to a machining station.

In FIG. 1, a schematic representation of a machining system 10 in accordance with the present invention is illustrated. The machining system 10 of the present invention is designed to allow a much thinner and therefore lighter and more flexible pallet 12 to be utilized for the mounting of large parts to fixture plates (not shown) that are affixed to the pallet 12 by the provision of a large stationary workpiece support or stand 14 at machining station 16. The machining station stand 14 has a much greater thickness in the horizontal direction than the pallet 12 to provide the necessary stiffness for accurate machining when the pallet 12 carrying the part to be machined is clamped to upstanding vertical wall 18 of the stand 14. Because the pallet 12 does not have to be very thick for providing the great mass to create the necessary stiffness for accurate machining of the large part, the pallet 12 can have a lighter weight construction which enables it to be transported in a much easier manner. This feature is of particular value where the machining station 16 is remotely located from storage station 20 for the pallets 12 and/or setup station 22 where the parts, and fixture plates are affixed to the pallets 12.

Figure 2:
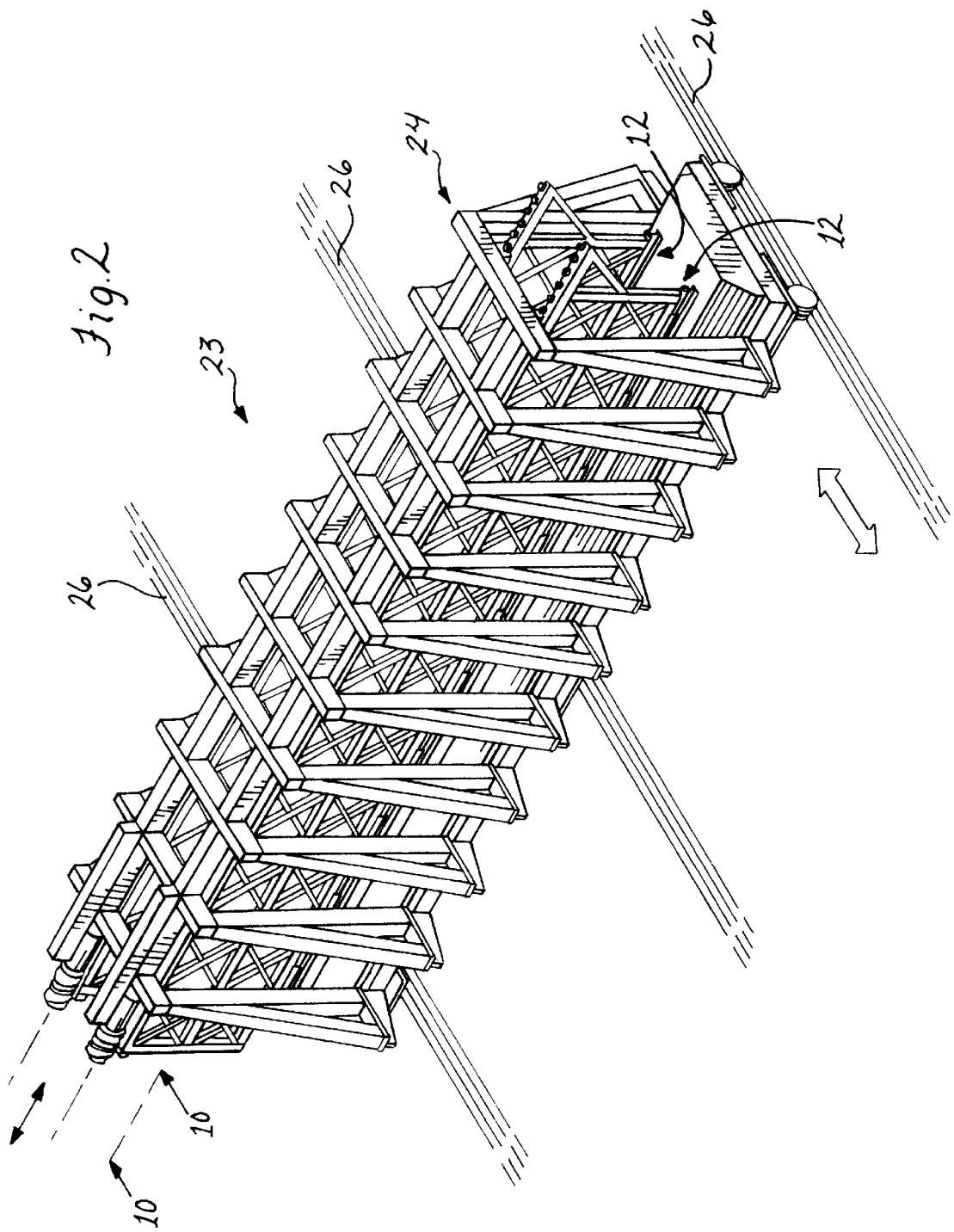
FIG. 2 is a perspective view of a transport car of the transporter transferring a pair of pallets between stations.

For transport of the pallets 12 from pallet storage station 20 to setup station 22 and then on to machining station 16, a transporter 23 is provided, as can be seen in FIGS. 1 and 2. The transporter 23 includes a transport car 24 adapted to ride on tracks 26 laid on the plant floor to run between the pallet storage station 20, setup station 22, and machining station 16. The transport car 24 is capable of carrying at least two transportable pallets 12 along with parts affixed thereto for being clamped to the sides of the stands 14 at the machining station 16 and the setup station 22, as will be more fully described hereinafter. The transportable pallets 12 are designed to be readily maneuvered around the plant floor by the transport car 24 as it rides along tracks 26 between the various stations 16, 20 and 22.

As previously stated, the present machining system 10 is particularly well adapted for machining large pieces such as aircraft parts by machine tools called profilers (not shown) that can be provided on either side of machining stand 14 for machining the parts affixed to pallets 12 which, in turn, are clamped to vertical sides or surfaces 18a and 18b of the vertical wall 18 of the upstanding machining stand 14. In the aircraft industry, the parts are often long, mirror image parts such as those for the right and left wings of airplanes so that the ability to machine these parts in pairs at the same time on either side 18a and 18b of the machining stand 14 is highly desirable.

The attachment and clamping of the pallet 12 to the stand 14 is particularly critical so that the stand 14 with its greater mass and stiffness can impart these characteristics to the pallet 12 carrying the work-piece(s). In the present system 10, the combined stiffness of the pallet 12 and stand 14 afforded by the clamping of the pallet 12 so that it is fixed to the stand 14 has to provide a strong fixturing for the workpiece so that it is held sufficiently rigid to allow for accurate machining, even where there are deep and heavy, rugged cuts being done on the part. In addition, because the machining is being done on parts that are generally long and high on the vertical surfaces thereof with the pallet 12 being supported on edge in a vertical orientation and having to withstand large cutting forces by a horizontal spindle directed transversely to the vertical, instability is introduced into the fixturing that otherwise would be absent if the part and mounting fixture were laid on a flat, horizontal surface with a vertical spindle doing the cutting. It is also desirable that the pallet 12 be able to be clamped to the stand 14 at the setup station 22 and the machining station 16 in a relatively short time period so as to reduce the time required for the machining cycle of a particular workpiece.

In this regard, the present machining system 10 utilizes a magnetic clamping arrangement including magnets 28 on the stand vertical wall 18 and magnet-engaging or magnetizable areas 30 on the rear side of the pallets 12. By the use of magnetic clamping, the machining system 10 herein avoids mechanical or hydraulic-type clamping mechanisms and their associated services such as supply and return lube and hydraulic oil lines, and only requires electrical control lines be run to the individual magnet units 28. As is apparent, the magnets 28 herein require significantly less in associated equipment than hydraulic or mechanical workpiece clamping systems, and accordingly will generally be more reliable. Also, because there are no moving members, there is also a reduction in maintenance requirements and the probability of down time is also lessened. Most importantly, the use of magnets allows for quick assembly and disassembly of the pallets 12 to the stands 14 so as to reduce the machining cycle time increasing production rates.

For properly aligning the magnets 28 of the stands 14 and the corresponding magnet-engaging areas 30 on the pallets 12, registering members, generally designated 29 (FIGS. 13 and 15), are provided on the pallet 12 and stand 14. More particularly, a longitudinal alignment mechanism 32 is provided at corresponding ends 34 and 36 of the pallet 12 and stand wall 18, respectively, which are opposite the end 38 of the stand wall 18 (FIG. 4) past which the pallets 12 are fed into position for magnetic clamping in front of the stand vertical wall surfaces 18a and 18b. The longitudinal alignment mechanism 32 is effective to align the magnets 28 and corresponding magnet engaging areas 30 longitudinally along the length of the stand wall 18 and pallet 12 with respect to each other. Vertical locating mechanism 40 is operable via a shiftable way or lift mechanism 42 and after the longitudinal alignment mechanism 32 is actuated so as to align the magnets 28 and corresponding magnet engaging areas 30 vertically so that they are at the proper height with respect to each other. Once the pallet 12 is longitudinally and vertically aligned by the alignment and locating mechanisms 32 and 40 and shifted toward the magnets 28 by the shiftable way mechanism 42 and a pulling mechanism 43, as will be described hereinafter, the magnets 28 can be activated so as to draw the pallet 12 toward the stand 14 with the magnetizable areas 30 on the pallet in registry with the magnets 28 and tightly held thereto by the magnetic force exerted therebetween. Thus, it is the magnetic force that clamps the pallet 12 to the stand 14 so that the stand 14 can impart its stiffness and rigidity to the pallet 12 to hold the workpiece affixed thereto rigid and flat for accurate and precise machining thereof.

Because the pallet 12 is much thinner than the normal pallet which is used to provide the stiffness and rigidly and prevent the bending or distortion of the workpiece during machining, it can be provided with a much lighter construction such as with the open frame structure, as can best be seen in FIG. 5. Preferably, the pallets 12 are made of steel tubing to reduce their weight and so that the pallets 12 offer little structural stiffness to the setup which instead is provided by the stand 14, as previously described. As shown, the pallet 12 has upper and lower tubular members 44 and 46 extending horizontally and parallel to each other with an intermediate tubular member 48 disposed midway between the upper and lower members 44 and 46 and extending parallel thereto. Spaced longitudinally along the members 44–48 are tubular members 50 extending vertically between the upper and lower members 44 and 46 and across intermediate member 48. Adjacent vertical members 50 cooperate to define upper and lower windows 52 and 54 between the upper member 44 and intermediate member 48 and the intermediate member 48 and lower member 46, respectively. The structure of the pallet frame 12 is completed by tubular cross members 56 that are arranged in pairs in each of the windows 52 and 54 and extending between the corners of the windows at the junctures of the members 44–48 with the vertical members 50 so as to form a series of X-shaped structures having a rectangular shaped frame extending therearound.

As previously stated,.the pallets 12 are very thin for their size which is large enough so that the pallets 12 are adapted to mount large aluminum pieces for machining, some of these parts being as large as 8 inches thick by 5 feet in width and 32 feet in length, such as common with certain aircraft parts. The present pallets 12 are adapted to support these large parts and accordingly are very long and high, but because they do not have to offer the structural stiffness necessary for accurate machining, they can also be made to be very thin relative to their height and length. By way of example and not limitation, the pallets 12 utilized herein can have a height of approximately 11.5 feet and a length of approximately 65 feet or 20 meters with a thickness of only approximately 8 inches.

Where the tubular members 44–50 comprising the pallets 12 are made of structural steel material and with the dimensions for the pallet 12 being as set forth above, the weight of the pallet 12 will be approximately 80,000 pounds. As is apparent, at this great weight, the eight inch thick pallet 12 will be fairly flimsy and obviously will not be able to provide the stiffness to the workpiece projecting from the pallet 12 to permit accurate machining thereof.

In comparison to the pallet 12, the stand 14 has a significantly greater mass and stiffness so that when the pallet 12 is magnetically clamped thereto, the combined stiffness for the workpiece projecting from the vertical pallet 12 will permit accurate machining thereof. In this regard, where the pallet 12 has the exemplary sizes as set forth earlier, it is preferred that the stand 14 have a thickness in the horizontal direction of approximately 63 inches as measured from surface 18a to surface 18b of the stand vertical wall 18 with this stand wall thickness being close to eight times thicker than the eight inch thick pallet 12. The longitudinal length and vertical height of the wall 18 are greater than that of the corresponding length and height of the pallet 12 for magnetic clamping of the pallet 12 thereto. The stand 14 stays permanently set at the machining station 16, and at the setup station 22 as will be described hereinafter, as by a large foundation 57 thereat with the stand wall 18 upstanding therefrom. Thus, the stand 14 is a much more massive and rigid structure than the transportable pallets 12 such that when the pallets 12 are magnetically clamped to the upstanding vertical wall 18, the stiffness of the stationary, rigid stand 14 is imparted to the pallet 12 and the workpiece affixed thereto to add the necessary rigidity to the setup for allowing accurate machining operations to take place.

As the large sizes of the parts to be machined can cause them to distort under their own weight when vertically oriented, clamping of the part and fixture plate to the pallet 12 and then magnetically clamping the pallet 12 to the stand 14 also serves to align and straighten the workpiece for proper machining results. In addition, a similar stand 14 can also be provided at the setup station 22, as depicted in FIG. 1. While there are no large machining forces which the pallet 12 must be able to withstand at the setup station 22, the pallet 12 must stay rigid enough during setup to allow for proper mounting and alignment of the workpiece thereto which the relatively flexible, thin pallet 12 does not afford without the use of the massive, rigid stand 14 herein.

Alternatively, where shorter length pallets 12 are utilized, such as ten meter long pallets, the setup station 22 can be provided adjacent to the machining station 16 and in a horizontal orientation so that the pallet 12 is laid onto the setup stand and then pivoted up for clamping to the upstanding stand 14 at the machining station 16 with the part affixed thereto. In this arrangement, shuttling of pallets 12 with affixed parts between the setup station 22 and machining station 16 substantially only involves pivoting of the pallet 12 up to a vertical orientation for clamping to the machining station stand 14 for machining by the horizontal spindle machine tool. With the ten meter long pallets 12, a pair of these pallets 12 can be placed end-to-end on each side 18a and 18b of the machining stand 14.

Figure 24:
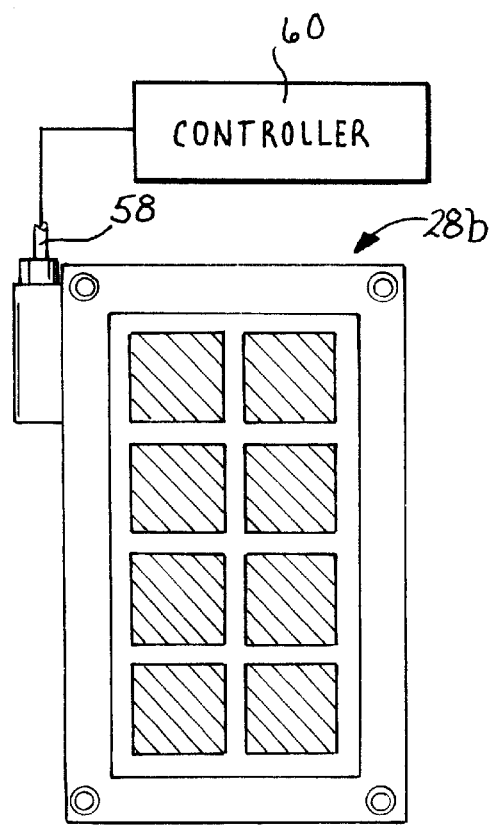
FIG. 24 is a front elevational view of an 8-pole magnet for the bottom row of magnets on the stand.
Figure 25:
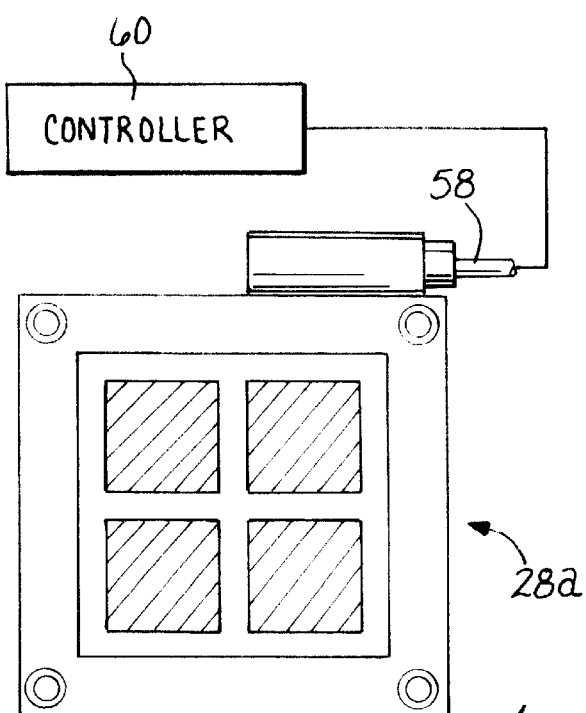
FIG. 25 is a front elevational view of a 4-pole magnet for the remaining rows of stand magnets.

It is preferred that the magnets 28 on the stand 14 be electromagnets 28 that can be selectively activated by a controller and associated circuitry 60 in a predetermined sequence, as will be described more fully hereinafter. As previously discussed, the use of the electromagnets 28 is advantageous over other types of clamping systems in that there are no moving parts that can wear or be damaged and services such as hydraulic and lube lines are eliminated, reducing the complexity of the clamping mechanism. Each electromagnet 28 is provided with electrical power by associated control lead lines 58, as shown in FIGS. 24 and 25.

The electromagnets 28 preferably are of the electropermanent type having an electropermanent circuit such that continuous power need not be supplied to the electropermanent magnets 28 to keep the magnetic clamping force applied to the pallets 12, and specifically the magnetized areas 30 thereon, as the electropermanent magnets 28 can take a charge and remained activated thereafter so that no electricity is required to keep the magnetic force in effect. To clamp the pallet 12 to the stand 14, the controller 60 sends signals along selected circuit control lines 58 switching the corresponding magnets 28 to their operating state where they generate a magnetic attraction force so as to draw the aligned pallet magnet engaging areas 30 into tight clamping engagement therewith. As such, during the working cycle of the electropermanent magnets 28 herein, there is no power being supplied along lead lines 58 to the magnets 28. To release the pallet 12, the controller 60 sends another signal along the circuit control lines 58, causing the magnets 28 to take a charge to reverse poles so that they are deactivated which releases the magnet engaging areas 30 from being held in clamped engagement therewith.

The main advantage in the use of the electro-permanent magnets 28 is that continuous power need not be provided to the magnets 28 during their working cycle so that should a power failure occur, the magnetic attraction force will not be lost and the pallet 12 will remain clamped to the stand wall 18, and specifically the electropermanent magnets 28 thereon. The fail-safe nature of the electropermanent magnets 28 utilized herein is of particular importance in the present machining system 10 due to the great size of the pieces being machined and the pallets 12 to which they are mounted. As is apparent, it is important that the pallet 12 remain clamped to the stand wall 18 without tipping over and falling despite any power interruptions that may occur as release of the pallet 12 could otherwise cause significant damage and create an unacceptable safety hazard.

The electropermanent magnets 28 also minimize the effects of residual magnetism whereby the magnetic force generated will not be transferred to the pallet 12 and, in particular, the magnetizable areas 30 thereon after the pallet 12 is released from being magnetically clamped to the stand wall 18. Residual magnetism in the pallet areas 30 could cause metal chips and particles generated during the machining operations to be attracted thereto potentially creating problems in terms of the magnetic clamping of the pallet 12 to the stand 14 for subsequent machining operations. The electropermanent magnets 28 herein substantially avoid this problem as they can be switched on and off with control circuitry 60. In effect, deactivation of the electropermanent magnets 28 demagnetizes everything so as to minimize residual magnetism as a problem.

Figure 3:
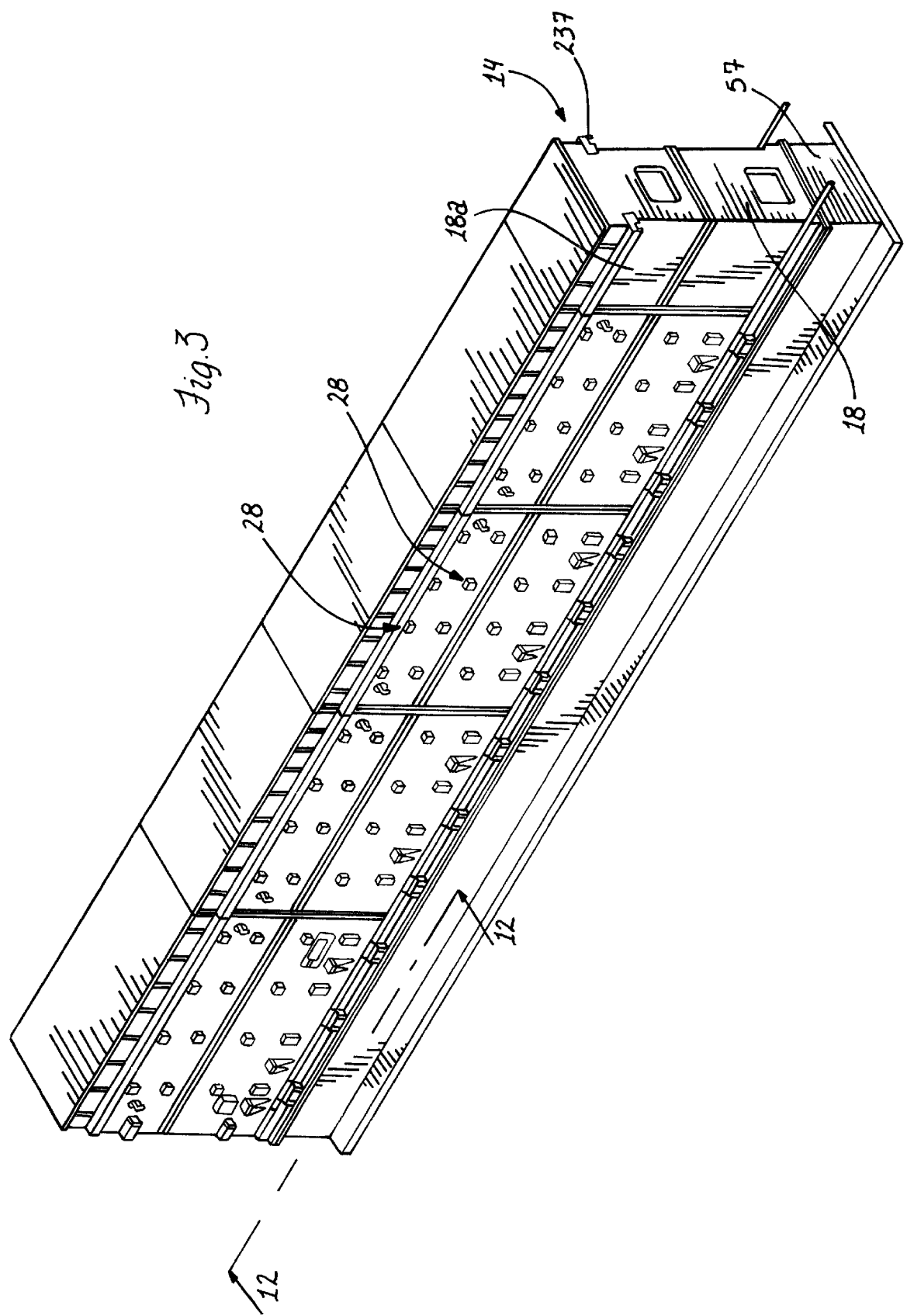
FIG. 3 is a perspective view of a machining stand at the machining station showing rows of electro-permanent magnets attached to one side of the vertical wall of the stand.
Figure 8:
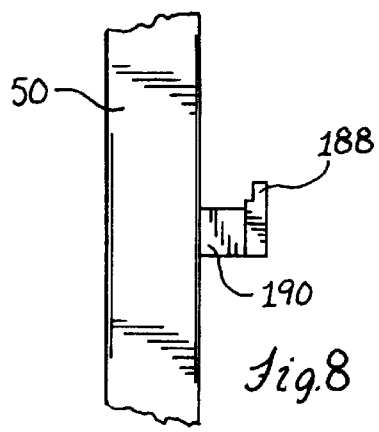
FIG. 8 is an enlarged fragmentary elevational view taken along line 8—8 of FIG. 5 showing a gripping lip attached to the rear side of the pallet.

It is also important that the clamping force generated by the electropermanent magnets 28 be dispersed and evenly distributed across the pallet 12 so that they are held flat against the stand wall 18 without any bending or distortion such as during high force machine cutting operations. In this regard, it has been found that rather than having a few large magnets generating large magnetic pulling forces on the pallet 12 at a few locations thereon which will not draw the entire pallet 12 in and leaves areas that are free to bend, a greater number of smaller sized electropermanent magnets 28 spread out over the large machine stand surfaces 18a and 18b can be more advantageously utilized to distribute and balance the magnetic clamping force evenly all across the back side of the pallet 12 so that it is evenly drawn against the stand wall 18 across its entire extent. In the preferred and illustrated form of the stand 14 at the machining station 10, four horizontal rows of sixteen electropermanent magnets 28 each are arranged on the stand wall surfaces 18a and 18b for a total of sixty-four magnets on each side 18a and 18b of the stand wall 18, as can be seen in FIG. 3 with respect to surface 18a.

As the rigidity of the clamping of the pallet 12 to the stand 14 at the setup station 22 is not as critical as at the machining station 16, the setup stand 14 can be provided with a lower number of magnets 28, such as half the number used on the sides 18a and 18b of the machining stand 14, i.e. four rows of eight magnets each. The stand 14 at the setup station 22 can have every other magnet 28 that is mounted to the stand 14 at the machining station 16 replaced with a locating block (not shown) of steel material case hardened with a plate of 4140 steel material for engaging corresponding locating pads 62 on the pallet 12.

Figure 12:
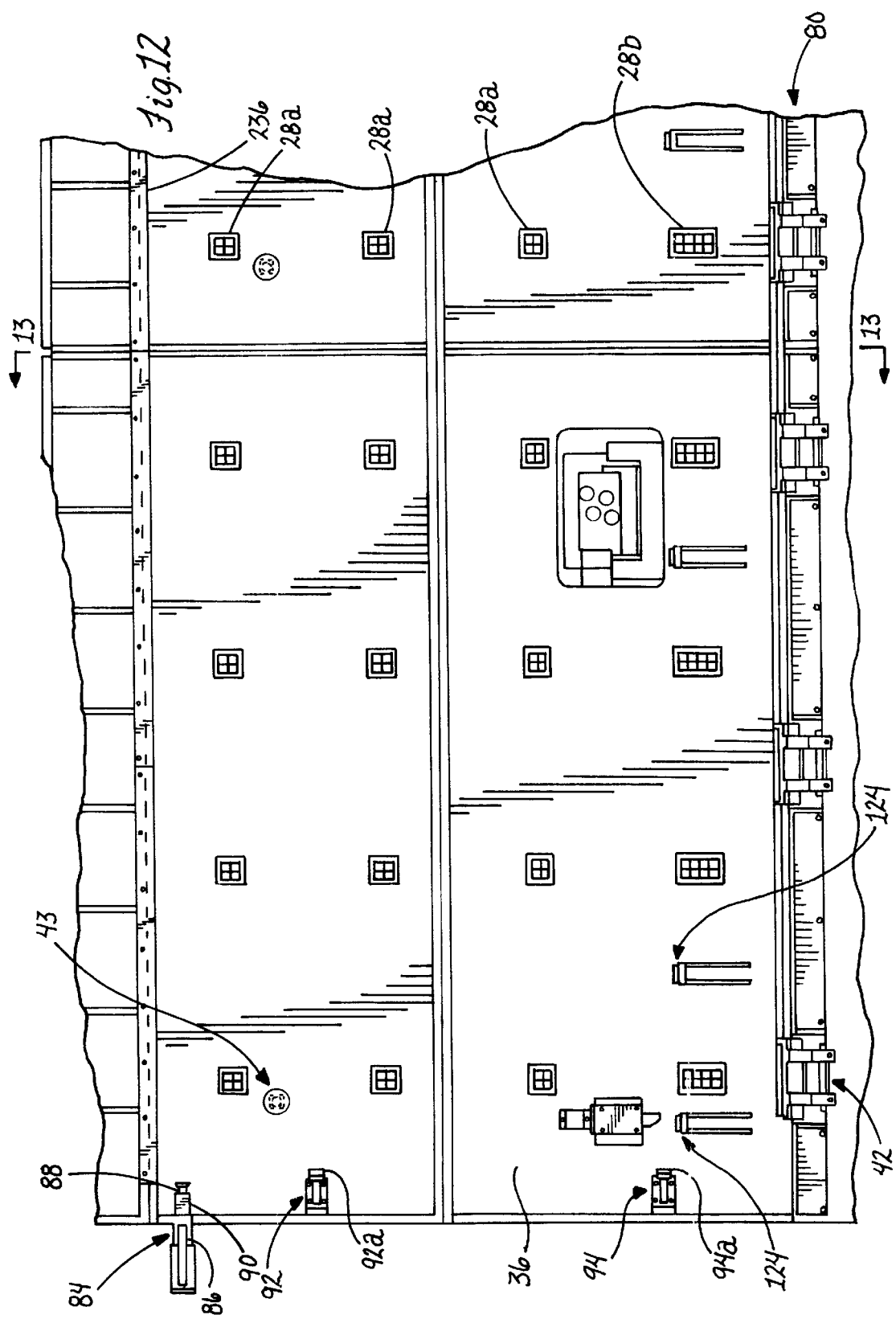
FIG. 12 is an enlarged fragmentary elevational view taken along line 12—12 of FIG. 3 of the stand vertical wall showing the rows of magnets, horizontal rests, a portion of a longitudinal alignment mechanism, and a lower way system on which the pallet roller bearings ride.

Referring to FIG. 12, it can be seen that the upper three rows of magnets 28a are smaller than the lowermost row of magnets 28b for reasons to be discussed hereinafter. More specifically, the electropermanent magnets 28a used in the upper three rows along the surfaces 18a and 18b of the stand 14 are smaller 4-pole units, such as shown in FIG. 25, whereas the bottom row of magnets 28b are larger 8-pole units, as illustrated in FIG. 24. Each of the smaller 4-pole magnets 28a generates a magnetic force in the range of approximately 800 to 1200 pounds with the magnetic force generated by the larger 8-pole magnets 28b being approximately twice that of the 4-pole magnets 28a. The magnets 28 used on the stands 14 can be obtained from the Italian company, Tecnomagnete®.

The magnetizable magnet engaging areas 30 of the pallets 12 are preferably provided on locating pads 62 (FIGS. 7 and 7A) attached to the vertical tubular steel members 50 of the pallet frame 12 on the backside thereof and spaced vertically therealong as by approximately 900 millimeters or 36 inches with four such pads 62 being on each vertical member 50, as can be seen in FIG. 5. There are sixteen vertical members 50 on the large twenty meter pallets 12 that have pads 62 attached thereto and which are longitudinally spaced at approximately 1250 millimeters or 50 inches from each other. Accordingly, the pads 62 form four horizontal rows of sixteen pads 62 each corresponding to the number and arrangement of the electropermanent magnets 28 on the stand wall 18. The pads 62 are of a magnetizable material such as a soft steel material.

When the pallets 12 are transferred from the transport car 24 into position in front of the upstanding vertical wall 18, there is a very small clearance between the magnets 28 and the locating pads 62, such as on the order of approximately 2 millimeters. Thereafter, the pallet 12 is shifted toward the stand wall 18 by way of the shiftable way mechanism 42 for moving the lower portion of the pallet 12 and by the pull-in device or pulling mechanism 43 for moving the upper portion of the pallet 12, as previously mentioned and as will be more fully described hereinafter. In this manner, the impact between the magnets 28 and the pads 62 is minimized when the magnets 28 are activated by controller 60. Case hardening as by hardening of a thin layer of material or by a through-hardened material can also be utilized for the softer steel material of the locating pads 62 to minimize wear thereof. As the flux height on the electropermanent magnets 28 is approximately ⅜ of an inch, the locating pads 62 can not be fully hardened because that would cause the magnetic force exerted between the magnets 28 and the locating pads 62 to drop considerably. Instead, case hardening is preferably utilized to keep the magnetic force high while at the same time protecting the soft steel material of the locating pads 62 from wear.

Figure 9:
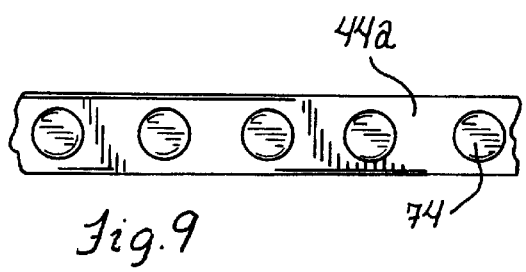
FIG. 9 is an enlarged fragmentary plan view taken along line 9—9 of FIG. 5 showing a drive rack at the top of the pallet.
Figure 10:
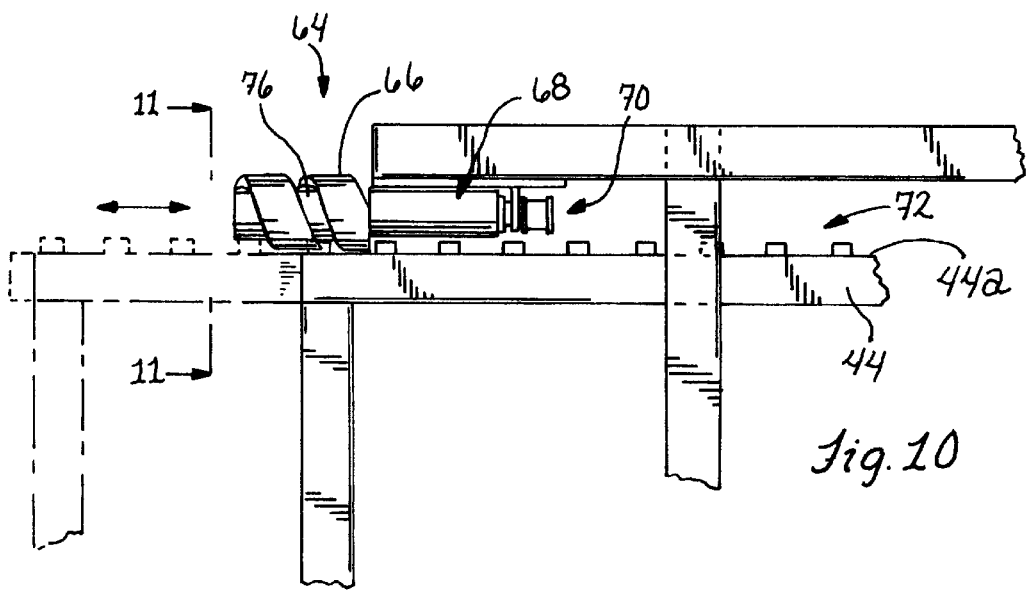
FIG. 10 is an elevational view of a barrel cam screw drive of the transporter for cooperating with the drive rack of the pallet.
Figure 11:
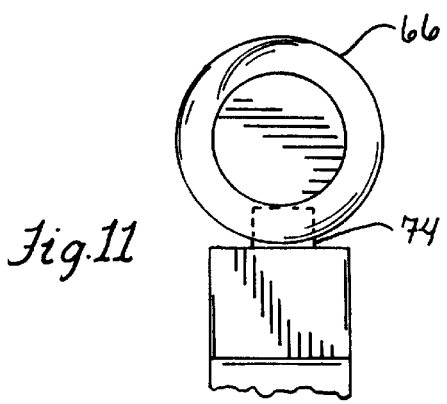
FIG. 11 is an elevational view taken along line 11—11 of FIG. 10 showing the screw drive and drive rack arrangement.

For loading the pallets 12 into and out from the transport car 24, a barrel cam screw drive 64 is mounted at the upper, front end of the car 24, as best seen in FIG. 10. The barrel drive 64 includes a rotatable cam screw member 66 driven for rotation by reversible motor 68 having an encoder 70 for controlling the feed rate of the pallet 12. The cam screw 66 cooperates with a drive rack 72 formed on the top of the horizontal tubular frame member 44 of the pallet 12. The drive rack 72 includes a plurality of circular boss projections 74 spaced longitudinally along top surface 44a of the pallet tubular member 44 which ride in helical groove 76 of the cam screw 66 for advancing the pallet 12 as the cam screw 66 is rotatably driven by motor 68 and for retracting the pallet 12 back into the car 24 when the cam screw 66 is rotated in an opposite direction by reversible motor 68, as illustrated in FIGS. 9–11.

Referring to FIGS. 5 and 7, the pallet 12 includes a plurality of roller bearing units 78 attached along the bottom of the pallet lower tubular member 46. The roller units 78 ride on a way system 80 provided adjacent the bottom of the stand 14 on either side of 18a and 18b thereof. Thus, for transfer of the pallet 12 from the transport car 24 to stands 14 at either the setup station 22 or machining station 16, the car 24 stops so that the rolling units 78 are in alignment with the way system 80 before the motor 68 for the barrel cam screw drive 64 is started.

Figure 14:
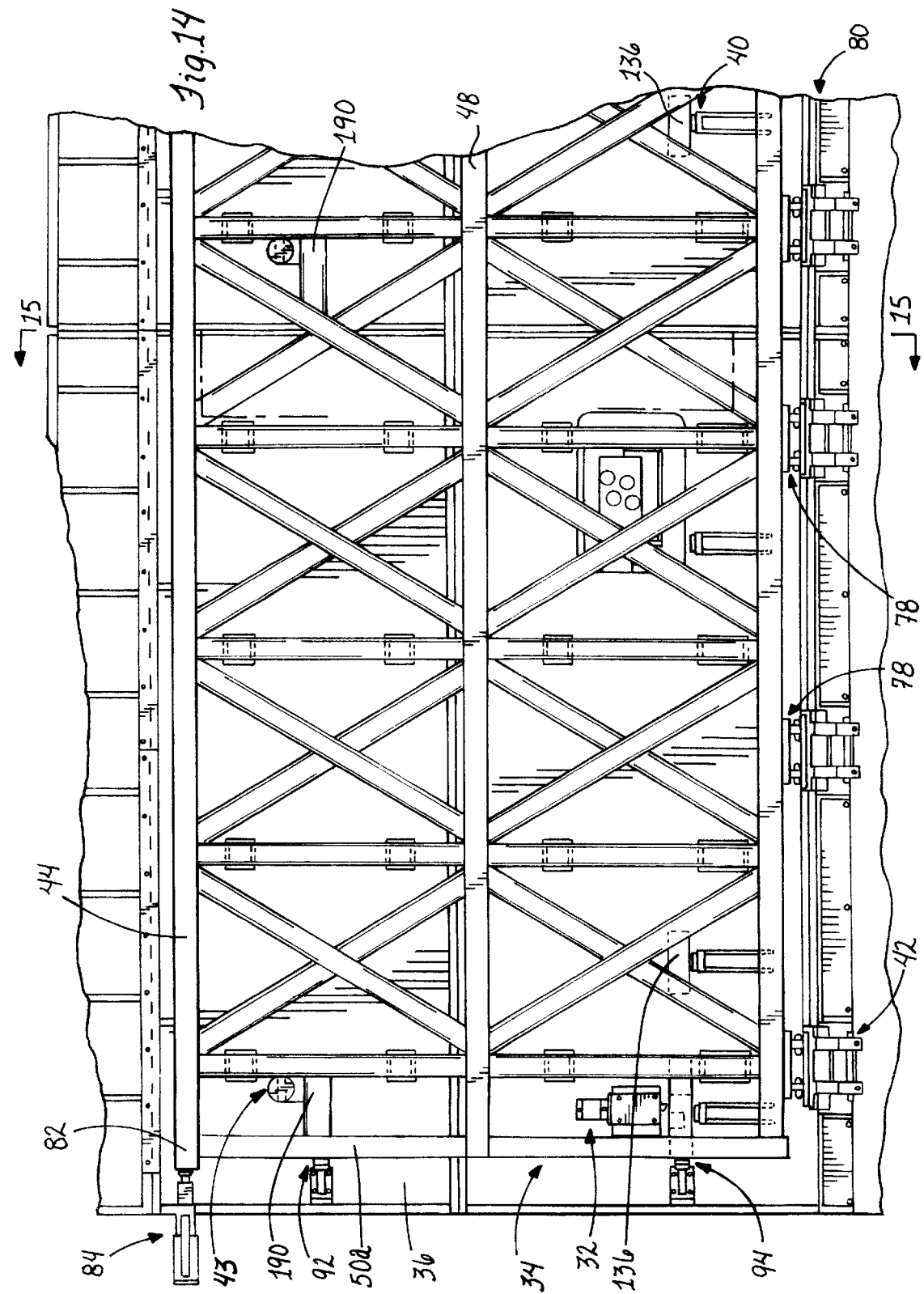
FIG. 14 is an elevational view of the pallet in front of the machining stand wall.

The pallet 12 is advanced along the way system 80 by the screw drive 64 in cooperation with the pallet drive rack 72 with end abutment portion 82 of the pallet upper member 44 that extends beyond the end most pallet vertical member 50*a* moving into engagement with shock absorber assembly 84 mounted by bracket 86 toward the top of the stand wall 18 at end 36 thereof, as shown in FIGS. 12 and 14. As the pallet 12 nears the end of its travel, upper extension portion 89 of the pallet frame 12 including end portion 91 of the upper frame member 44 having drive rack projections 74 thereon (FIG. 5) moves into operative engagement with the cam screw 66 for transfer of the pallet 12 out from the transport car 24, and after part setup and/or machining, back into the transport car 24. The abutment portion 82 at the other end of the pallet member 44 moves into engagement with plunger 88 of the shock absorber 84 with the plunger retracting into cylinder housing 90 therefor until the pallet vertical tubular member 50*a* abuts a pair of hard stops 92 and 94 below the shock absorber 84 attached to the end 36 of the stand wall 18. The encoder 70 for the screw drive motor 68 slows the pallet 12 as the end vertical member 50*a* approaches the stops 92 and 94 and positions it thereagainst by stopping of the motor 68 so as to cease advancement of the pallet 12 on the way system 80 relative to the stand wall 18. The stops 92 and 94 can each include respective proximity switches 92*a* and 94*a* such that when the pallet vertical member 50*a* is abutted against the stops 92 and 94, the proximity switches 92*a* and 94*a* will sense that the pallet 12 is at the end of its travel and signal the longitudinal alignment mechanism 32 for activation.

Figure 16:
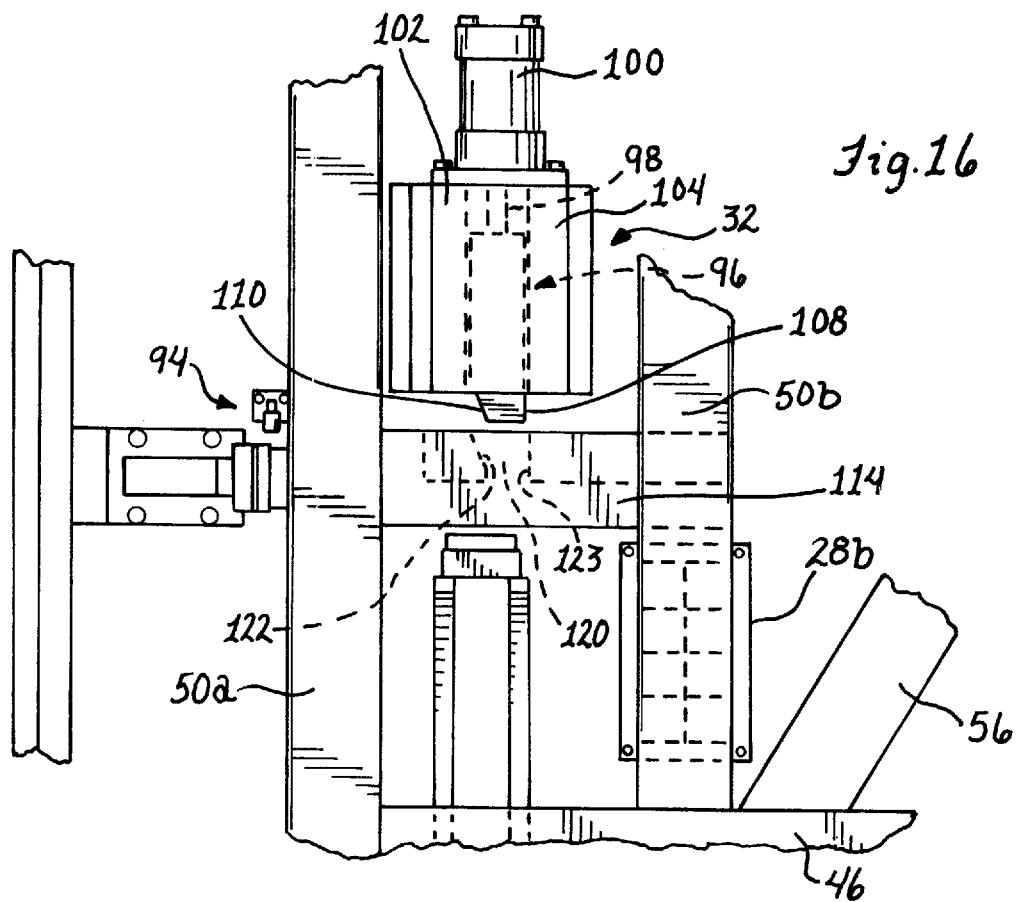
FIG. 16 is an enlarged fragmentary elevational view showing the longitudinal alignment mechanism including a tapered lock pin in its retracted position.
Figure 17:
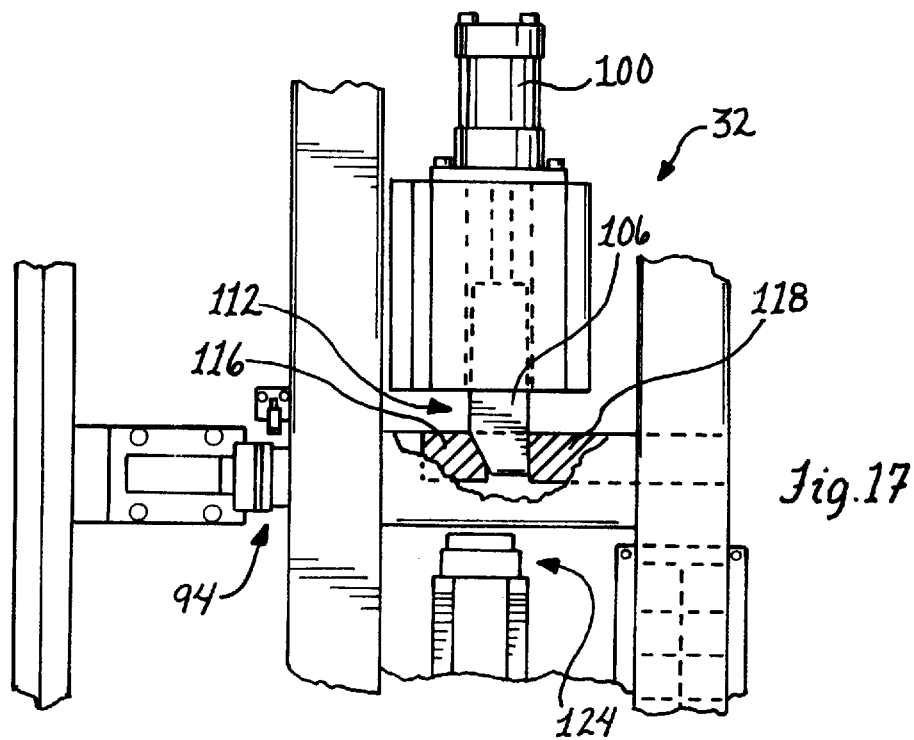
FIG. 17 is a view similar to FIG. 16 partially broken away to show the tapered lock pin extended and engaged with a wedge block arrangement of the pallet.

Referring more specifically to FIGS. 16 and 17, the longitudinal alignment mechanism 32 includes a tapered lock pin 96 attached to one end of cylinder rod 98 which is driven for reciprocation into and out from piston cylinder 100 for retracting and advancing the lock pin 96. As shown, the cylinder 100 is rigidly mounted to the stand wall 18 adjacent the lower stop 94. As the cylinder rod 98 is extended and retracted, the tapered lock pin 96 is guided in its reciprocating movement by a pair of elongate guide members 102 and 104 rigidly mounted on either side thereof below the cylinder housing 100. The lock pin 96 can have a substantially cylindrical surface 106 with the end 108 thereof distal from the rod 98 beveled so as to form a tapered cam surface 110 for cooperating with a wedge block arrangement 112 attached to the rear side of the pallet 12. More particularly, the wedge block arrangement 112 can be attached to a horizontal or transverse frame member 114 extending between and pallet vertical member 50*a* and immediately adjacent pallet vertical member 50*b*. The wedge block arrangement 112 includes a pair of spaced block members 116 and 118 for forming a wedge opening 120 therebetween for receipt of the tapered end 108 of the lock pin 106 therein.

Wedge block 116 has an inclined or tapered surface 122 which faces straight, vertical surface 123 of block 118 and together which define the wedge opening 120 between the blocks 116 and 118. When the pallet 12 abuts against the stops 92 and 94, the tapered cam surface 110 on the end 108 of the lock pin 96 is generally vertically aligned with the inclined surface 122 of block 116. With the pallet frame member 50*a* abutted against the stops 92 and 94, the alignment mechanism 32 is activated, and specifically, the lock pin 96 thereof is fired downwardly by driving of the cylinder rod 98 out from the cylinder 100 causing the lock pin 96 to be extended downwardly with the cam surface 110 engaging the tapered surface 122, as can be seen in FIG. 17. As the surfaces 110 and 122 slide against each other, the pallet 12 is shifted longitudinally on the way system 80 to tightly clamp the pallet member 50*a* against the stops 92 and 94. Because of the low coefficient of friction between the roller bearing units 78 and the way system 80, only one lock pin 96 and cooperating wedge block arrangement 112 is necessary for rolling the pallet 12 along the way system 80 to longitudinally align the pallet 12 relative to the stand wall 18 and clamp it against the stops 90 and 92.

The alignment mechanism 32 can be provided with limit switches (not shown) to provide an indication when the pallet 12 is locked in place by the lock pin 96 and wedge block arrangement 112. With the tapered lock pin locked, engaged in the wedge block arrangement 112, the lift mechanism 42 of the way system 80 is activated to lower the pallet 12 onto stops or horizontal rests 124 of the vertical locating mechanism 40.

More particularly, the roller units 78 each include opposing sets of roller bearings 126 and 128 journalled for rotation in bearing housing 130, as best seen in FIG. 7. The rollers 126 and 128 are canted inwardly toward each other and ride on rail 132 of the way system 80. After the pallet 12 is initially shuttled in front of the stand wall 18 with vertical pallet member 50*a* abutted against the stops 92 and 94, the roller units 78 will each be supported on a portion or section 134 of the rail 132 which forms part of the shiftable way or lift mechanism 42, as illustrated in FIG. 14 in the pallet supporting position. When the rail section 134 is pivoted downwardly to its lowered position, the pallet 12 is lowered down onto the horizontal rest 124 of the stand 14 as by vertical locating members 136 attached to the backside of the pallet 12 between cross frame members 56, as can be seen in FIGS. 5 and 6.

Referring next to FIGS. 18–20, for pivoting of the rail sections 134, the shiftable way mechanism 32 each include a pivot shaft 138 mounted for rotation about its longitudinal axis 138*a* in pivot support blocks 140 and 142 and specifically, in cylindrical bushings 144 thereof. Attached to the shaft 138 for rotation therewith is an intermediate pivot member 146 disposed between the support blocks 140 and 142 and end pivot members 148 and 150 on either side of respective support blocks 140 and 142. An elongate pivot arm 152 mounts the rail section 134 on top surface 154 thereof in an elongate concave recess 156 formed therein. The pivot arm 152 is attached to the pivot members 146–150 along its outer surface 158 relative to the stand wall 18 with the surface 158 being spaced from the support blocks 140 and 142 to provide for clearance during pivoting of pivot arm 152 and rail section 134 thereon. A high-pressure fluid cylinder 160 is disposed on a bridge support 162 spanning the space between the support blocks 140 and 142 toward the bottom thereof so as to position the cylinder 160 under the support arm 152, as best seen in FIG. 19. The power cylinder 160 can be a hydraulic cylinder designed to provide 1000 psi of force for lowering of the pallet 12 and for raising the pallet 12 to bring the rail section 134 back into alignment with the remainder of the way system rail 132.

The cylinder 160 pivots the arm 152 by way of actuating member 164 thereof. Pivoting of the lift mechanism 42 after the tapered lock pin 96 has been fired is caused by retraction of the actuating member 154 which allows the pivot shaft 138 to rotate about its axis 138*a* in the direction indicated by arrow 166 so as to drop the rail sections 134 along with the roller units 78 thereon and thus the pallet 12 therewith in a downward direction and to also shift the lower portion of the pallet 12 toward the stand wall 18. As previously mentioned, the pallet 12 is rolled in front of the stand wall 18 along the rail 132 such that the pallet pads 62 are spaced with a small clearance of approximately 2 millimeters from the magnets 28. Preferably, when the lift mechanism 42 is activated, shifting of the rail sections 134 from their support position to their lowered position moves the lower portion of the pallet 12 inward toward the stand wall 18 by approximately 2 millimeters so as to bring the pallet locating pads 62 in close proximity or into engagement with the corresponding magnets 28 of the stand 14, particularly those pads 62 and magnets 28 in the lower rows on the pallet 12 and stand 14, respectively.

For verifying that the rail sections 134 have been shifted and lowered by the appropriate amount, a limit switch assembly 168 is provided, as is shown in FIG. 19. A plate finger actuator 170 is attached to the pivot arm top surface 154 and projects toward the stand wall 18 for being moved into and out of engagement with the vertically oriented switch 172 mounted above the finger actuator 170 by right angle bracket 174 to vertical wall portion 176. Thus, when the pivot shaft 138 of the lift mechanism 42 pivots in the direction of arrow 166, the pivot arm 152 moves downwardly and toward stand wall 18 along with the finger switch actuator 170 attached thereto. Pivoting the pivot arm 152 along with the rail section 134 thereon the prescribed distance e.g. 2 millimeters toward the stand wall 18, causes the switch 172 to change states so as to provide an indication that the desired pivoting action has occurred stopping further pivoting of the lift mechanism 42. Similarly, when the lift mechanism 42 is activated to raise the rail sections 134 back into alignment with the remainder of the way system rail 132, the switch 172 can be used to provide an indication when the rail sections 134 have been raised sufficiently so that they are aligned with the remainder of the rail 132.

Once the lift mechanism 42 has lowered the rail sections 134 the prescribed distance, the pallet locating members 136 and including transverse frame member 114 of the pallet 12 will be supported on the horizontal rests 124 attached to the stand wall 18 so that the entire weight of the pallet 12 and any workpiece(s) affixed thereto will be borne by the horizontal rests 124. In this regard, the rests 124 are provided with a sturdy, gussetted construction with each including a steel support platform 178 with a pair of elongate parallel steel gusset 180 and 182 members extending downwardly therefrom and being rigidly attached to the stand wall 18 as by welding or the like. The support platform 178 mounts a pad rest 184 that can be formed of elastomeric material for providing a cushioned support to the locating members 136 of the pallet 12, as best seen in FIG. 21. Both the support platform 178 and pad rests 184 thereon are provided with aligned vertical central bores 178a and 184a in which a proximity switch 186 can be disposed for sensing and verifying that the vertical locating members 136 have moved into engagement with and are supported by the horizontal rests 124.

With the weight of the pallet 12 supported by the horizontal rests 124 as by engagement of the locating members 136 and the transverse frame member 114 (FIG. 20A) with the rest pads 184, the longitudinal alignment mechanism 32 is again activated for locking the pallet 12 in place longitudinally relative to the stand wall 18. Firing the lock pin 96 downwardly with full force causes the tapered end 108 to move fully into the wedge opening 120 that has been lowered by pivoting of the lift mechanism 42 to its lowered position so that the lock pin cam surface 110 is tightly engaged with the tapered surface 122 of the block member 116 and the cylindrical surface 106 is engaged with the vertical flat surface 123 of the block member 118, as can be seen in FIG. 20A.

Figure 23:
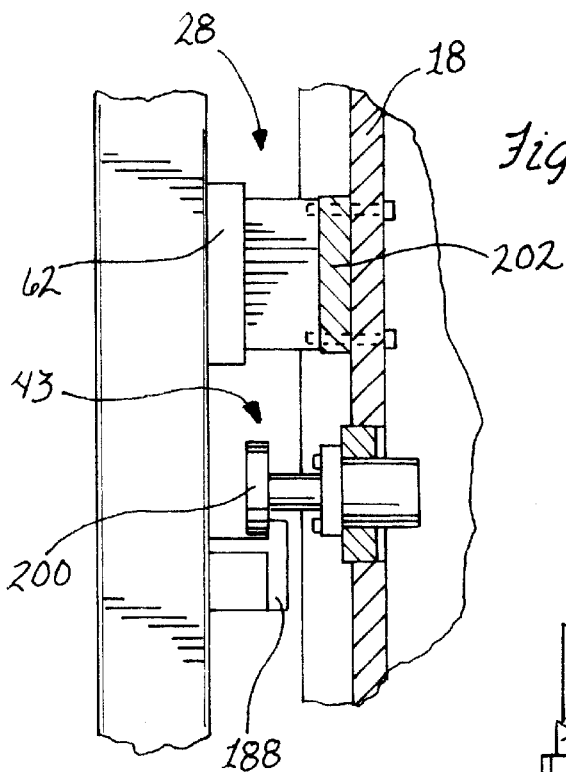
FIG. 23 is a view similar to FIG. 22 with the pallet pads pulled against the magnets.

After the lock pin 96 has been fired to lock the pallet 12 longitudinally, the pull-in device 43 is actuated so as to move the upper portion of the pallet 12 inward toward the stand wall 18 to bring the pallet locating pads 62 thereon into close proximity or into engagement with the corresponding magnets 28 of the stand 14, particularly those pads 62 and magnets 28 in the upper rows on the pallet 12 and stand 14, as can be seen by reference to FIGS. 22 and 23. The pull-in mechanism 43 includes a vertical flange lip 188 formed on the rear side of the pallet 12, and specifically on upper transverse members 190 of the pallet frame 12, as best seen in FIGS. 5 and 22. The upper transverse members 190 can extend between adjacent vertical members 50 as well as between a vertical frame member 50 and the intersection of adjacent cross members 56 above the pallet intermediate member 48.

Fluid cylinder assemblies 194 of the pull-in device 43 are mounted to the stand wall 18 and include a hydraulic cylinder housing 196 for extending and retracting a piston rod 198 having a finger flange 200 formed at its end distal from the cylinder 196. The cylinder assemblies 194 are mounted at a height along the upper portion of the vertical stand wall 18 such that with the piston rod 198 extended and as the pallet 12 is rolled in along the way system 80, the finger flanges 200 will clear the top of transverse members 190 and move behind a gripping portion 188a of the corresponding flange lips 188 extending upwardly beyond the transverse members 190. Preferably three cylinder assemblies 194 are mounted across the stand wall 18, and three corresponding flange lips 188 are provided on the pallet 12. As the cylinder assemblies 194 are not equally spaced from each other, a fourth flange lip 188 is also provided so that the pallet 12 can be clamped to either side 18a or 18b of the stand 14.

As is shown in FIG. 22, after the pallet 12 is shifted so that the lower portion thereof has been moved toward the stand wall 18 with its weight borne by the horizontal rests 124 of the wall 18, and the pallet 12 is longitudinally locked by the longitudinal alignment mechanism 32, the upper portion of the pallet 12 will be pivoted slightly outwardly from the vertical wall 18 such that there is a slight gap 202 between the locating pad 62 and the corresponding magnets 28 on the stand wall 18. Activating the pull-in device 43 so that the piston rod 198 is smoothly and slowly retracted into cylinder housing 196 causes the finger flange 100 to pull against the backside of the flange lip gripping portion 188a to gently shift the pallet 12 toward the stand wall 18 substantially closing the gap 202 between the locating pads 62 and the magnets 28, as can be seen in FIG. 23. Activating the pull-in device 43 brings the pallet pads 62 at the upper portion of the pallet 12 close to or into engagement with the corresponding magnets 28 on the stand wall 18 with little or no impact force generated therebetween so there is little or no wear created at the interface between magnet face 29 and pad faces 63.

Once the upper portion of the pallet 12 has been shifted toward the stand wall 18 such that all of its locating pads 62 are aligned with and in close proximity to or engaged with the magnets 28, the magnets 28 are then charged by the controller 60 in a predetermined sequence to tightly clamp the pallet 12 to the stand wall 18 and complete the pallet clamping cycle. Preferably, magnets 28 adjacent the stand horizontal rests 124 are activated before the other magnets 28 so as to more easily overcome the frictional resistance to any sliding of the locating members 136 along the pad rests 184. In this regard, as the stand rests 124 are disposed toward the bottom of the stand wall 18 as can be seen in FIG. 12, it is the lower row of the larger magnets 28b which are initially activated before the remaining smaller magnets 28a in the rows thereabove. Having the larger magnets 28b adjust the rests is advantageous in that a larger magnetic pulling force will be exerted near the interface of the locating members 136 and pad rests 184 so that it is the larger magnets 28b that are primarily responsible for overcoming the friction at this interface and causing any sliding necessary to draw the lower row of pads 62 tightly against the magnets 28b.

Accordingly, it is preferred that the magnets 28 be sequentially energized in a row-by-row bottom to top sequence so that the bottom row of magnets 28b is the initial row of magnets 28 that are activated and the top row of magnets 28a is the last row that is activated by the controller 60. In this manner, the pallet 12 is rolled or pivoted into clamped position against the stand wall 18 and specifically the magnets 28 thereon so as to minimize and overcome the frictional resistance between the locating members 136 and the horizontal rests 124. Accordingly, as each succeeding row of magnets 28a above the bottom row of magnets 28b is activated, the function of these magnets 28a is more to simply position the locating pads 62 against the magnets 28 rather than causing any sliding between the locating members 136 and rests 124 which has already been done by the larger, lower magnets 28b. In addition, because the shiftable way mechanism 42 and pull-in device 43 have moved the pallet pads 62 into close proximity to the magnets 28, slamming of the pallet pads 62 against the magnets 28 when they are activated is avoided and there will be very little motion between the engaging surfaces 63 and 29 of the respective pallet pads 62 and stand magnets 28 when the magnets 28 are fired so wear therebetween will be minimized.

Figure 29:
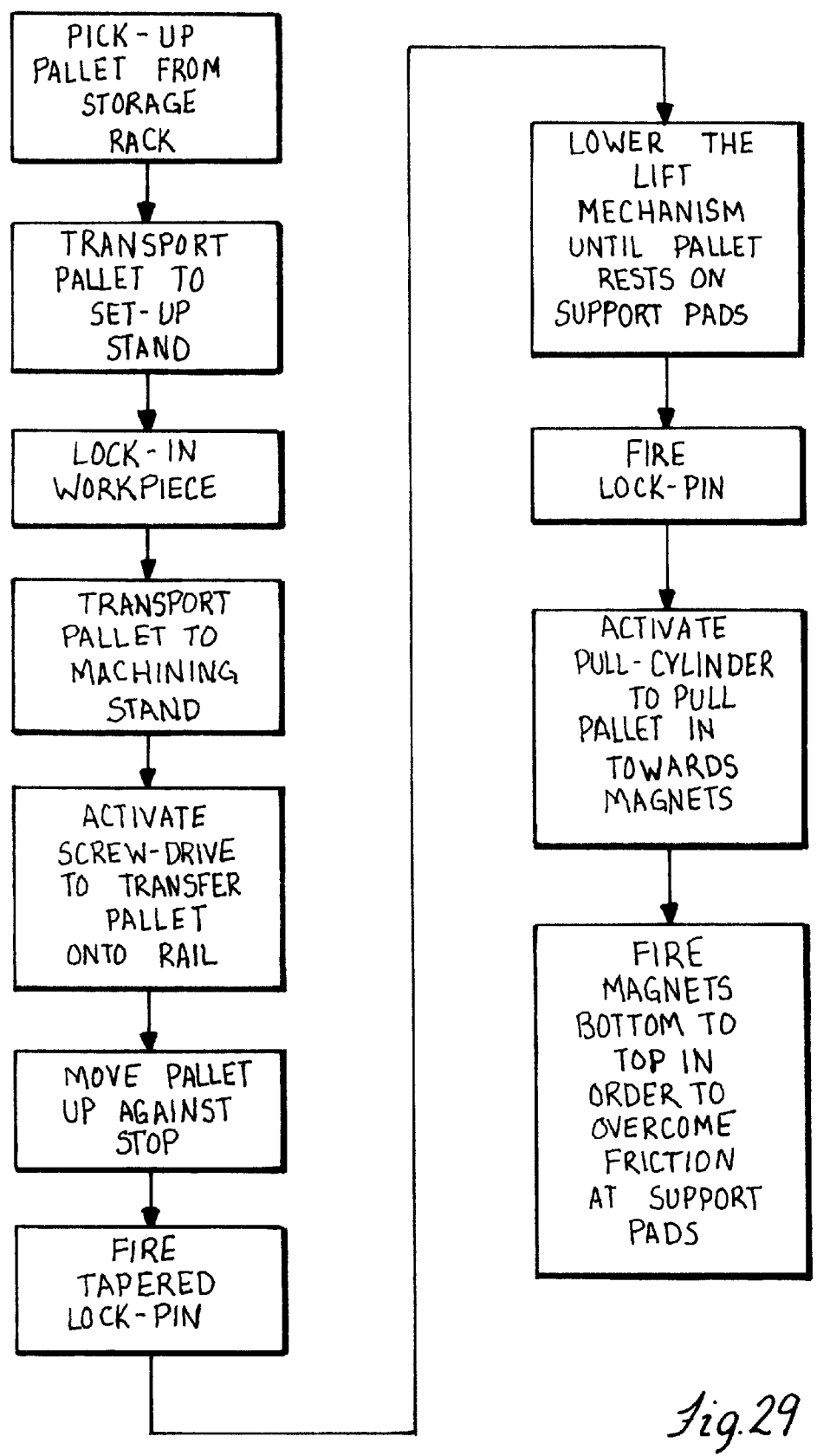
FIG. 29 is a block diagram view depicting a method of transporting the pallet, setting it up with a workpiece mounted thereon and transporting the pallet and attached workpiece to the machining station for magnetic clamping to the machine stand.

With reference to FIG. 29, the general operation of the present machining system 10 will next be summarized. Initially, the transport car 24 of the transporter 23 is shuttled to the pallet storage station where the pallets 12 are loaded into the transport car 24 which then rides along rails 26 to take the pallets 12 to the setup station 22. With the larger twenty meter pallets 12, the pallets 12 are transferred from the car 24 for clamping to a stand 14 thereat for locking in workpieces. The workpieces are typically clamped to a fixture plate and then clamped onto the pallet 12 where-upon the pallet 12 and affixed workpieces are loaded back into the transport car 24 for transport to the machining station 16.

Where the stands 14 are provided at both the setup station 22 and machining station 16 as with larger pallets 12, the process involved in clamping the pallet 12 to the stand 14 at the setup station 22 and at the machining station 16 are substantially identical.

Initially, the barrel cam screw drive 64 is activated advancing the pallet 12 longitudinally along way system 80 until the pallet leading end 34 is engaged against stops 92 and 94. Thereafter, the tapered lock pin 96 of the longitudinal alignment mechanism 32 is activated so as to provide an initial longitudinal alignment of the pallet 12 relative to the stand wall 18, and specifically longitudinally aligning the pallet locating pads 62 relative to the stand magnets 28. With the lock pin 96 advanced into wedge opening 120 and engaged between block members 116 and 118, the shiftable way mechanism 42 is then activated so as to drop the rail sections 134 and the roller units 78 thereon. In this manner, the pallet 12 is lowered so that the pallet locating members 136 of the vertical locating mechanism 40 are supported by the horizontal rests 124 attached to the stand wall 18. At this point, the pallet locating pads 62 are substantially longitudinally and vertically aligned with the stand magnets 28 on the stand wall 18. In addition, the pivoting action of the way mechanism 42 shifts the lower portion of the pallet 12 inwardly toward the stand wall 18 so as to move the lower rows of locating pads 62 into close proximity to or engagement with the corresponding lower rows of magnets 28.

With the weight of the pallet 12 off of the rail 132 and specifically the shiftable sections 134 thereof, the tapered lock pin 96 is again actuated so as to lock the pallet 12 against any longitudinal movement relative to the stand wall 18. Subsequently, the pull-in device 43 is activated for pulling the upper portion of the pallet 12 in toward the stand wall 18 by retraction of the finger flange 100 pulling on the flange lip 188. At this time, all of the locating pads 62 are in close proximity to or engaged with the magnets 28 so as to minimize the impact when the magnets 28 are activated by controller 60.

The magnets 28 are then fired in a predetermined sequence with the bottom row of larger magnets 28b being the first row activated as they are adjacent the horizontal rests 124 having the vertical locating members 126 supported thereon so that any sliding action therebetween is primarily caused by the larger magnetic attraction exerted by the larger eight pole magnets 28b disposed in the lower row of magnets 28 on the stand wall 18 for more readily overcoming the frictional resistance to such sliding action. Successively higher rows of magnets 28 are then sequentially energized in a bottom to top sequence so as to roll or pivot the pallet 12 into clamped position with the locating pads 62 held tightly against the magnets 28.

As previously discussed, should there be a power failure, the electropermanent magnets 28 herein will continue to exert a magnet attraction force holding the locating pad 62 thereagainst so as to eliminate the danger of losing the magnetic clamping power during power losses and having the pallet 12 and attached workpiece tip and fall over. For releasing the held pallet 12, the magnet assemblies 28 are provided with a special construction with a spacer shim member 202 attached between the bodies 204 of the magnets 28 and the stand wall 18 as by bolt fasteners 206 and 208.

Figure 26:
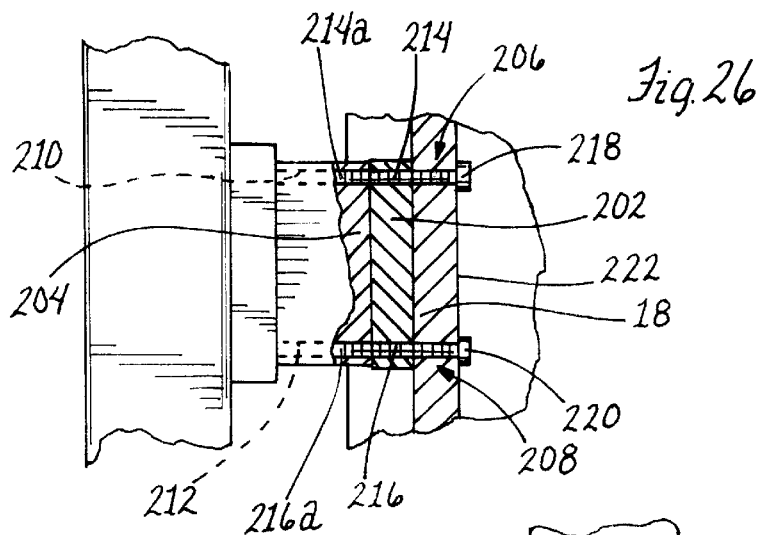
FIG. 26 is an elevational view partially in section showing a magnet mounting arrangement including a spacer shim member between the stand wall and magnet, and the pallet pad magnetically held to the magnet.
Figure 27:
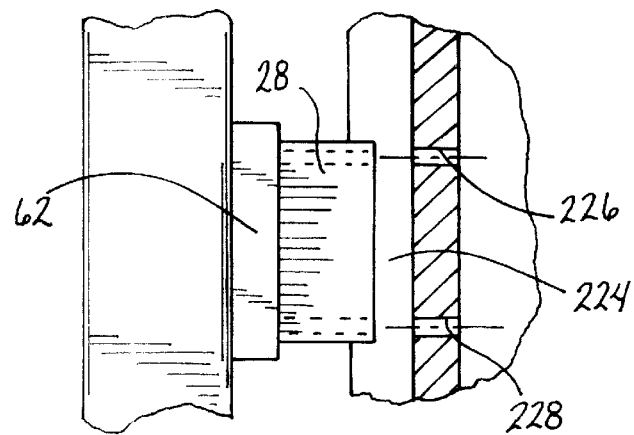
FIG. 27 is a view similar to FIG. 26 showing bolts removed from the magnet and spacer shim member to release the spacer shim member from behind the magnet.
Figure 28:
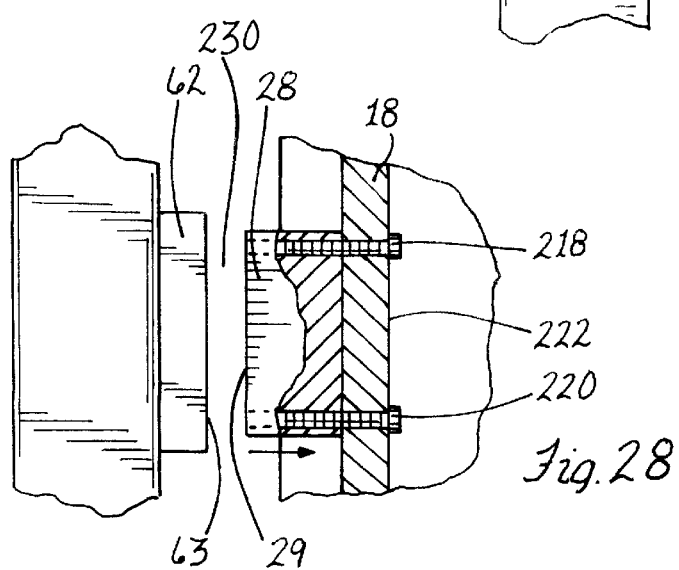
FIG. 28 is a view similar to FIGS. 26 and 27 showing the bolts reinserted for pulling the magnet back toward the stand wall and off from the pallet pad.

Referring to FIGS. 26–28, the magnet bodies 204 are provided with a pair of tapped holes 210 and 212 for receipt of threaded bolt shanks 214 and 216 of respective bolts 206 and 208, and specifically respective distal ends 214a and 216a thereof, as illustrated in FIG. 26. As shown, the bolts 206 and 208 are bolted from the inside of the stand wall 18 so that respective enlarged bolt heads 218 and 220 thereof are abutted against vertical wall interior surface 222. Thus, to release the magnets 28 from their magnetic attraction to the locating pads 62, the bolts 206 and 208 can be removed from the inside of the stand 14 allowing the spacer members 202 to drop from between the back of the magnets 28 and the front of the stand wall 18 leaving gap 224 therebetween, as illustrated in FIG. 27. As is apparent, the size of the gap 224 will substantially correspond to the thickness of the spacer member 202.

Thereafter, the bolts 206 and 208 are reinserted into through apertures 226 and 228 in stand wall 18 that are aligned with the tapered holes 210 and 212 in the magnet bodies 204 so that the shank ends 214a and 216a can be inserted into the tapered holes 210 and 212. Tightening the bolts 206 and 208 so that their heads 218 and 220 clamp against the wall interior surface 222 pulls the magnet 28 toward the stand wall 18 and off from the locating member 62 against the magnetic attraction force being exerted therebetween through the gap 224 and against the front of the stand wall 18 leaving an air gap 230 between the magnet face 29 and the engaging face 63 of the locating member 62, as depicted in FIG. 28. The size of air gap 230 will substantially correspond to that of gap 224 and thus the thickness of spacer member 202 and is selected so that the magnetic attraction force generated by the magnet 28 will no longer be sufficient to draw the corresponding locating pad 62 thereagainst with the magnets 28 pulled tightly against the stand wall 18 by the bolts 206 and 208.

The spacer shim members 202 also allow the magnet faces 29 to be adjusted so that a substantially flat vertical plane is defined by all the magnet faces 29 as taken together and against which the pallet 12 is clamped. In this manner, there is no need for secondary rest pads on the stand wall 18 around the magnets 28 as the magnets 28 themselves are used as locating members to make sure that the pallet 12 is in flat alignment thereagainst.

Figure 13:
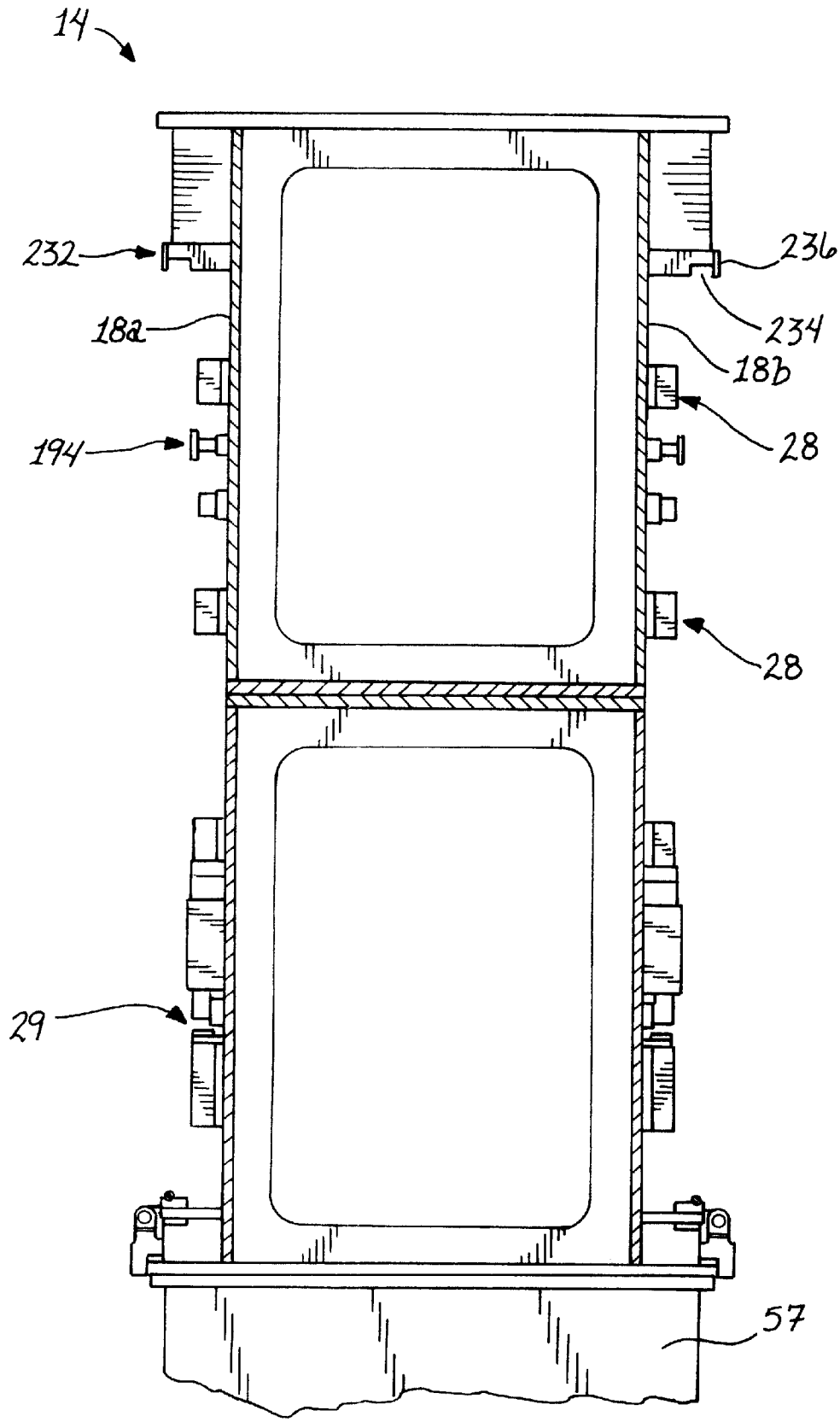
FIG. 13 is a cross-sectional view taken along line 13—13 of FIG. 12 showing opposite sides of the machining stand.
Figure 15:
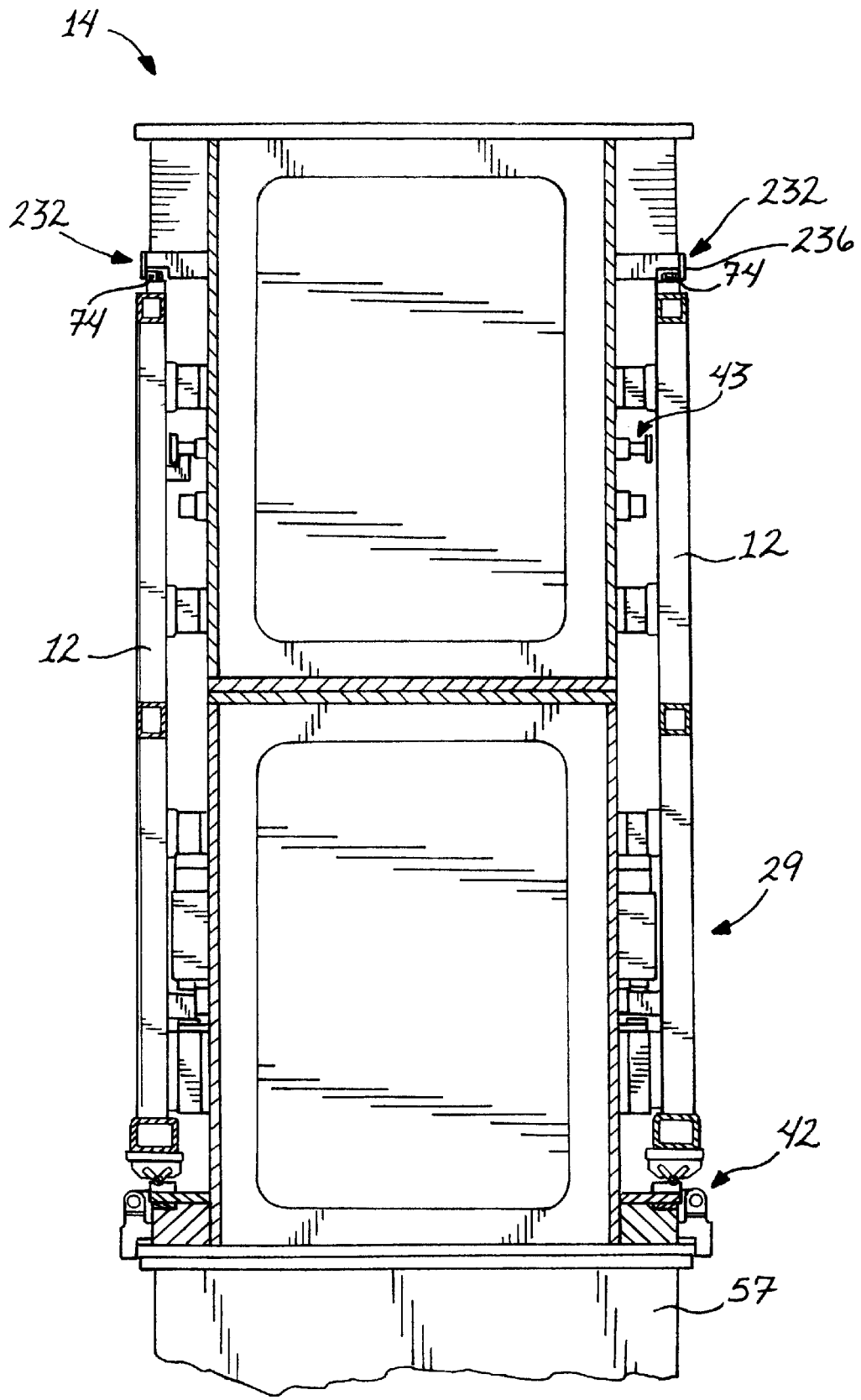
FIG. 15 is a cross-sectional view taken along line 15—15 of FIG. 14 showing a pair of pallets on either side of the machining stand wall.

To prevent tipping of the pallet 12 during transfer of the pallets 12 to and from the transport car 24, and when power fails and after the spacer shim members 202 have been released from behind the magnets 28, the stand 14 has longitudinally extending upper guide members 232 provided toward the top of the stand wall 18. The guide members 232 each define a downwardly open channel 234 for receipt of the drive rack boss projections 74 of the pallets 12 therein, as can be seen in FIGS. 3, 13 and 15. The guide 232 includes a depending retaining lip 236 which will abut against the projections 74 so as to prevent tipping of the pallet 12 away from the stand wall 18 maintaining the projections 74 in the guide member channel 234.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A pallet holding apparatus comprising:
   a pallet having a relatively lightweight construction with a thin cross-sectional configuration so that the pallet is flexible;
   a rigid support against which the pallet is supported;
   magnetizable areas of the pallet that are to be magnetically drawn toward the rigid support for bringing one side of the pallet against the support leaving the other side of the pallet free for attaching a workpiece thereto;
   magnets of the rigid support that generate a predetermined magnetic force; and
   a controller that activates the magnets to exert the predetermined magnetic force causing the pallet magnetizable areas to be drawn toward the rigid support so that the pallet is tightly held to the support to provide rigidity to the otherwise flexible pallet.

2. The apparatus of claim 1 wherein the pallet magnetizable areas are formed on pads attached to the pallet with the magnets and pads being arranged in horizontal rows across the support and pallet, and the controller activates the magnets in a bottom to top sequence with lower rows of magnets activated for pulling in corresponding lower rows of pallet pads thereto before higher rows of magnets are activated.

3. The apparatus of claim 1 wherein the magnets are electropermanent magnets and the controller includes circuitry connected to the magnets with the controller activating or deactivating the magnets by supplying an electrical charge thereto via the circuitry without requiting continuing power to the magnets for magnetically attracting and holding the corresponding pallet magnetizable areas thereto or releasing the areas therefrom so that power interruptions do not affect the magnetic holding force applied by the magnets to the pallet magnetizable areas.

4. The apparatus of claim 1 wherein the pallet is approximately 10 to 20 meters in length.

5. The apparatus of claim 4 wherein the support is approximately seven to eight times ticker than the pallet.

6. The apparatus of claim 1 wherein each of the magnets exert between approximately 800 pounds to approximately 1200 pounds of magnetic force.

7. The apparatus of claim 1 wherein the rigid support comprises a vertical stand includes a shiftable way mechanism and has horizontal rests and tie pallet includes bearings and vertical locating members, and the way mechanism has a support position with the pallet bearings being supported by the stand way mechanism and a lowered position with the way mechanism shifted so that the pallet locating members engage the rests to locate the pallet vertically relative to the stand and support the weight of the pallet with the rests.

8. The apparatus of claim 7 wherein the rests and locating members are disposed toward the bottoms of the stand and pallet, respectively, and the controller activates the magnets in a bottom to top sequence for sliding the locating members along the stand rests to minimize and overcome the friction therebetween as the pallet is drawn toward the stand.

9. The apparatus of claim 8 wherein the magnets disposed toward the bottom of the stand exert a larger magnetic force than the magnets thereabove for pulling the locating members with a greater force along the rests than the higher magnets.

10. The apparatus of claim 1 wherein the support comprises a vertical stand, and longitudinal and vertical alignment mechanisms cooperating between the stand and pallet for substantially aligning the magnets with the corresponding pallet areas prior to activation of the magnets by the controller.

11. The apparatus of claim 1 wherein the support comprises a stand having a vertical wall, and spacer members mounted between each magnet and the stand wall and which are released to allow the magnets to be pulled off from the corresponding pallet areas for detaching the pallet from being magnetically held to the wall when power to the controller fails.

12. The apparatus of claim 11 wherein the spacer members include bolts for attaching the magnets thereto, and removing the bolts releases the spacer members from behind the magnets to allow the bolts to be reinserted for connecting to the magnets magnetically held on the corresponding pallet areas for pulling the magnets with the bolts off therefrom.

13. The apparatus of claim 1 wherein the support comprises a stand, and a purling mechanism cooperating between the stand and pallet for pulling the pallet areas toward the corresponding stand magnets prior to activation of the magnets by the controller to minimize the impact between the magnets and engaging areas when the magnets are activated.

14. The pallet holding apparatus of claim 1 wherein the rigid support comprises a stand having a vertical wall to which the magnets are attached for holding the pallet to the wall in a vertical orientation thereof.

15. The pallet holding apparatus of claim 1 wherein the magnetizable areas of the pallet comprise magnet engaging areas on the one side of the pallet.

16. The pallet holding apparatus of claim 15 wherein the magnet engaging areas comprise pads of a magnetizable metal material attached on the one side of the pallet.

* * * * *